(12) United States Patent
Je et al.

(10) Patent No.: US 12,335,796 B2
(45) Date of Patent: Jun. 17, 2025

(54) DEVICE AND METHOD FOR PERFORMING HANDOVER IN WIRELESS COMMUNICATION SYSTEM

(71) Applicant: Samsung Electronics Co., Ltd., Gyeonggi-do (KR)

(72) Inventors: Donghyun Je, Gyeonggi-do (KR); Byunghyun Lee, Gyeonggi-do (KR); Jungsoo Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 332 days.

(21) Appl. No.: 17/779,860

(22) PCT Filed: Nov. 25, 2020

(86) PCT No.: PCT/KR2020/016856
§ 371 (c)(1),
(2) Date: May 25, 2022

(87) PCT Pub. No.: WO2021/107608
PCT Pub. Date: Jun. 3, 2021

(65) Prior Publication Data
US 2023/0014613 A1    Jan. 19, 2023

(30) Foreign Application Priority Data
Nov. 25, 2019 (KR) .................. 10-2019-0152577

(51) Int. Cl.
*H04W 36/00* (2009.01)
*H04W 36/30* (2009.01)

(52) U.S. Cl.
CPC ... *H04W 36/0058* (2018.08); *H04W 36/0061* (2013.01); *H04W 36/0064* (2023.05); *H04W 36/302* (2023.05)

(58) Field of Classification Search
CPC ......... H04W 36/0058; H04W 36/0061; H04W 36/30; H04W 36/0064; H04W 36/008375;
(Continued)

(56) References Cited

U.S. PATENT DOCUMENTS 5,434,950 A    7/1995 Kaallman
10,524,179 B2    12/2019 Anchan et al.
(Continued)

FOREIGN PATENT DOCUMENTS

CN    101511111    8/2009
CN    107439039    12/2017
(Continued)

OTHER PUBLICATIONS

European Search Report dated Jan. 27, 2024 issued in counterpart application No. 202080083028.X, 16 pages.
(Continued)

*Primary Examiner* — Jamal Javaid
(74) *Attorney, Agent, or Firm* — The Farrell Law Firm, P.C.

(57) ABSTRACT

The present disclosure relates to a communication technique for fusing, with an IoT technology, a 5G communication system for supporting a higher a data transmission rate than a 4G system, and a system therefor. According to various embodiments of the present disclosure, a method performed by a base station of a serving cell in a wireless communication system may comprise the steps of: transmitting configuration information for an artificial intelligence (AI)-based handover to a terminal; receiving, from the terminal, a handover request to a target cell according to the AI-based handover; and transmitting, to the terminal, a configuration message for access to the target cell, in response to the handover request, wherein the target cell is identified on the
(Continued)

basis of a neural network (NN) configured for the AI-based handover and a measurement result of the terminal.

24 Claims, 23 Drawing Sheets

(58) Field of Classification Search
CPC ....... H04W 36/00835; H04W 36/0085; H04W 36/08; H04W 36/302; H04W 36/26
See application file for complete search history.

(56) References Cited

U.S. PATENT DOCUMENTS

| | | | |
|---|---|---|---|
| 11,201,784 | B2 | 12/2021 | Peng et al. |
| 2007/0293185 | A1 | 12/2007 | Hwang et al. |
| 2009/0022134 | A1 | 1/2009 | Chun et al. |
| 2009/0104910 | A1 | 4/2009 | Lee et al. |
| 2009/0149180 | A1 | 6/2009 | Kitazoe |
| 2010/0080192 | A1* | 4/2010 | Dong ................. H04B 1/70753 370/332 |
| 2015/0319653 | A1 | 11/2015 | Wang et al. |
| 2016/0302128 | A1 | 10/2016 | Anchan et al. |
| 2017/0303180 | A1 | 10/2017 | Kapoulas et al. |
| 2019/0335376 | A1* | 10/2019 | Huang .............. H04W 36/0094 |

FOREIGN PATENT DOCUMENTS

| | | |
|---|---|---|
| CN | 107979859 | 5/2018 |
| CN | 105517070 | 3/2019 |
| CN | 109447275 | 3/2019 |
| CN | 109495935 | 3/2019 |
| CN | 109688597 | 4/2019 |
| CN | 110225535 | 9/2019 |
| EP | 1 097 602 | 9/2001 |
| EP | 1 107 630 | 5/2003 |
| EP | 3 051 877 A1 | 8/2016 |
| KR | 10-1999-0084445 | 12/1999 |
| KR | 10-2002-0087409 | 11/2002 |
| KR | 10-2007-0073571 | 7/2007 |
| KR | 10-2009-0038975 | 4/2009 |
| KR | 10-2014-0005386 | 1/2014 |
| KR | 10-2017-0137082 | 12/2017 |
| WO | WO 2018/085416 | 5/2018 |

OTHER PUBLICATIONS

3GPP TS 38.300 V0.1.3, 3GPP, 3rd Generation Partnership Project; Technical Specification Group Radio Access Network; NG Radio Access Network; Overall Description; Stage 2 (Release 15), Apr. 2017, 28 pages.
European Search Report dated Dec. 22, 2022 issued in counterpart application No. 20893111.3-1216, 15 pages.
PCT/ISA/210 Search Report issued on PCT/KR2020/016856, Mar. 9, 2021, pp. 5.
PCT/ISA/237 Written Opinion issued on PCT/KR2020/016856, Mar. 9, 2021, pp. 7.
Panasonic, 3GPP TSG-RAN WG2 Meeting#107bis, R2-1912693 (Revision of R2-1909255), Chongqing, China, Oct. 14-Oct. 18, 2019, "Discussion on the leaving conditions for CHO", pp. 4.
Korean Office Action dated Nov. 21, 2024 issued in counterpart application No. 10-2019-0152577, 11 pages.

* cited by examiner

DEVICE AND METHOD FOR PERFORMING HANDOVER IN WIRELESS COMMUNICATION SYSTEM

PRIORITY

This application is a National Phase Entry of International Application No. PCT/KR2020/016856, which was filed on Nov. 25, 2020, and claims priority to Korean Patent Application No. 10-2019-0152577, filed in the Korean Intellectual Property Office on Nov. 25, 2019, the entire content of each of which is incorporated herein by reference.

TECHNICAL FIELD

The disclosure generally relates to a wireless communication system and, more particularly, to an apparatus and a method for performing a handover in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency (mmWave) bands (e.g., 60 GHz bands) so as to accomplish higher data rates. To decrease the propagation loss and increase the transmission distance of the radio waves in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, technical development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying and quadrature amplitude modulation (FQAM) and sliding window superposition coding (SWSC) as an advanced coding modulation (ACM) scheme, and filter bank multi carrier (FBMC), non-orthogonal multiple access (NOMA), and sparse code multiple access (SCMA) as an advanced access technology have also been developed.

When a wireless terminal which is communicating accesses another cell from a currently accessing cell without service disconnection, a handover procedure is defined. At this time, in order to increase the communication performance, a scheme for a more optimized handover is being considered.

DISCLOSURE OF INVENTION

Technical Problem

Based on the above background, the disclosure provides an apparatus and a method for performing a handover in a wireless communication system.

The disclosure provides an apparatus and a method for performing an artificial intelligence (AI)-based handover in a wireless communication system.

The disclosure provides an apparatus and a method for configuring parameters for the AI-based handover in a wireless communication system.

The disclosure provides an apparatus and a method for transmitting neural network information for the AI-based handover in a wireless communication system.

The disclosure provides an apparatus and a method for adaptively performing the AI-based handover in a wireless communication system.

The disclosure provides an apparatus and a method for managing a neural network (NN) model configured for the AI-based handover in a wireless communication system.

The disclosure provides an apparatus and a method of a BS or a UE defined when signaling for the AI-based handover fails in a wireless communication system.

The disclosure provides an apparatus and a method of a BS or a UE defined when validation of a handover request fails in a wireless communication system.

The disclosure provides an apparatus and a method for learning related to the AI-based handover in a wireless communication system.

Solution to Problem

According to various embodiments of the disclosure, a method performed by a BS of a serving cell in a wireless communication system includes transmitting configuration information for an artificial intelligence (AI)-based handover to a UE, receiving a handover request to a target cell according to the AI-based handover from the UE, and transmitting a configuration message for access to the target cell to the UE, based on the handover request, and the target cell is identified based on a neural network (NN) configured for the AI-based handover and a measurement result of the UE.

According to various embodiments of the disclosure, a method performed by a user equipment (UE) in a wireless communication system includes receiving configuration information for an artificial intelligence (AI)-based handover from a BS of a serving cell, identifying a target cell according to the AI-based handover, based on a neural network (NN) configured for the AI-based handover and a measurement result, transmitting a handover request to the target cell to the BS, and receiving a configuration message for access to the target cell from the BS.

According to various embodiments of the disclosure, a BS of a serving cell in a wireless communication system includes at least one transceiver; and at least one processor connected to the at least one transceiver, and the at least one processor may be configured to control the at least one transceiver to transmit configuration information for an artificial intelligence (AI)-based handover to a UE, control the at least one transceiver to receive a handover request to a target cell according to the AI-based handover from the UE, and control the at least one transceiver to transmit a configuration message for access to the target cell to the UE, based on the handover request, and the target cell may be identified based on a neural network (NN) configured for the AI-based handover and a measurement result of the UE.

Advantageous Effects of Invention

An apparatus and a method according to various embodiments of the disclosure can effectively perform a handover in consideration of an individual situation of a UE or a BS by performing the handover using artificial intelligence (AI).

Advantageous effects obtainable from the disclosure may not be limited to the above-mentioned effects, and other effects which are not mentioned may be clearly understood, through the following descriptions, by those skilled in the art to which the disclosure pertains.

BEST MODE FOR CARRYING OUT THE INVENTION

Figure 1:
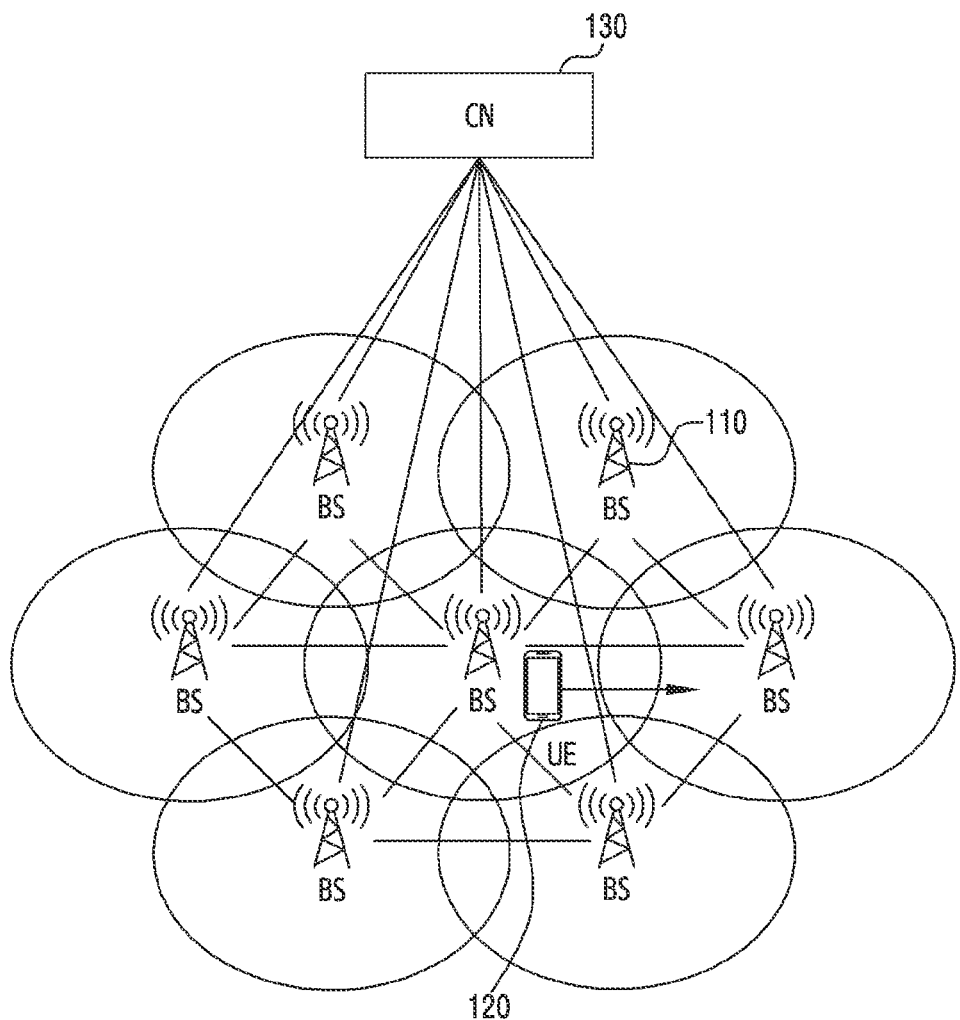
FIG. 1 illustrates a wireless communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

The term referring to a signal (for example, message, signal, signaling, sequence, or stream), the term referring to resources (for example, symbol, slot, subframe, radio frame, subcarrier, resource element (RE), resource block (RB), bandwidth part (BWP), or occasion), the term for operation (for example, step, method, process, or procedure), the term referring to data (for example, information, parameter, variable, value, bit, symbol or codeword), the term referring to a channel, the term referring to control information (for example, downlink control information (DCI), medium access control control element (MAC CE), or radio resource control (RRC) signaling), the term referring to network entities, and the term referring to an element of a device, used in the following description are only examples for convenience of description. Accordingly, the disclosure is not limited to those terms, and other terms having the same technical meanings may be used.

Further, in the disclosure, the expressions "larger than" or "smaller than" may be used to indicate whether a specific condition is satisfied or fulfilled, but are used only to indicate examples, and do not exclude "larger than or equal to" or "equal to or smaller than". A condition indicating "larger than or equal to" may be replaced with "larger than", a condition indicating "equal to or smaller than" may be replaced with "smaller than", and a condition indicating "larger than or equal to and smaller than" may be replaced with "larger than and smaller than or equal to".

Further, in the disclosure, a control device, a control unit, or a controller which is an element of a device to describe the operation may include one or more processors configured to perform operations of embodiments. In addition, the processor may control elements of the device such as a transceiver, a display, and a memory.

A wireless communication system has developed to be a broadband wireless communication system that provides a high speed and high quality packet data service, like the communication standards, for example, high speed packet access (HSPA) of 3GPP, long-term evolution (LTE) or evolved universal terrestrial radio access (E-UTRA), LTE-advanced (LTE-A), LTE-Pro, high rate packet data (HRPD) of 3GPP2, ultra mobile broadband (UMB), and 802.16e of IEEE, beyond the voice-based service provided at the initial stage.

In an LTE system corresponding to a representative example of the broadband wireless communication systems, a downlink (DL) adopts an orthogonal frequency division multiplexing (OFDM) scheme and an uplink (UP) adopts a single carrier frequency division multiple access (SC-FDMA) scheme. The uplink is a radio link through which a user equipment (UE) or a mobile station (MS) transmits data or a control signal to a base station (BS) (or gNode B), and the downlink is a radio link through which the BS transmits data or a control signal to the UE. In the multiple access schemes as described above, time-frequency resources for carrying data or control information are allocated and operated in a manner to prevent overlapping of the resources, that is, to establish the orthogonality, between users, so as to identify data or control information of each user.

A post-LTE communication system, that is, a 5G communication system, should be able to freely reflect various requirements of a user and a service provider, and thus it is required to support a service which satisfies the various requirements. Services which are considered for the 5G communication system include enhanced mobile broadband (eMBB), massive machine type communication (mMTC), and ultra reliability low latency communication (URLLC).

The eMBB aims to provide a data transmission rate which is improved so as to surpass the data transmission speed supported by conventional LTE, LTE-A, or LTE-Pro. For example, in the 5G communication system, the eMBB should provide a peak data rate of 20 Gbps in the downlink and a peak data rate of 10 Gbps in the uplink from the viewpoint of one base station. The 5G communication system should provide an increased actual perceived transmission rate of the UE (user perceived data rate) while providing the peak data rate. In order to satisfy such requirements, improvement of various transmission/reception technologies, including a further improved multi-input multi-output (MIMO) transmission technology, is needed. Further, while the current LTE system uses transmission bandwidths from a bandwidth of 2 GHz to a maximum bandwidth of 20 MHz to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

Further, in order to support an application service such as the Internet of things (IoT), mMTC is considered in the 5G communication system. The mMTC is required to support access of a multitude of UEs within a cell, improve coverage of the UE, increase a battery lifetime, and reduce the costs of the terminal in order to efficiently provide IoT. IoT is attached to various sensors and devices to provide communication, and thus should support a large number of terminals (for example, 1,000,000 UEs/km$^2$) within the cell. Further, since the terminal supporting the mMTC is highly likely to be located in a shade area, such as a basement, which a cell cannot cover due to service characteristics, the mMTC requires wider coverage than other services provided by the 5G communication system. The terminal supporting the mMTC needs to be produced at low cost and it is difficult to frequently exchange a battery thereof, so that a very long battery lifetime, for example, 10 to 15 years, is required.

Last, in the URLLC is a cellular-based wireless communication service used for a particular purpose (mission-critical). For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLS should satisfy a radio access delay time (air interface latency) shorter than 0.5 milliseconds and should also have requirements of a packet error rate equal to or smaller than 10 s. Accordingly, for services supporting the URLLC, the 5G system should provide a transmit time interval (TTI) smaller than that of other systems and also has design requirements of allocating wide resources in a frequency band in order to guarantee reliability of a communication link.

Three services of 5G, namely eMBB, URLLC, and mMTC, may be multiplexed and transmitted in one system. At this time, in order to meet the different requirements of the respective services, different transmission/reception schemes and transmission/reception parameters may be used for the services.

Further, in communication, more evolved services such as mobile hologram, virtual reality, and augmented reality have been raised. In order to support the services, element technologies such as an artificial intelligence (AI) technology, a sensing technology, wired/wireless communication and network infrastructure, a service interface technology, and a security technology are being researched in the communication system.

Hereinafter, embodiments of the disclosure are described in detail with reference to the accompanying drawings.

In describing embodiments of the disclosure, a description will be omitted of the technical contents that are well known in the technical field to which the disclosure pertains and are not directly related to the disclosure. This is to make the subject of the disclosure more clear without ambiguity thereof by omitting an unnecessary description.

For a similar reason, some elements are exaggerated, omitted, or schematically illustrated in the accompanying drawings. Further, the size of each element does not totally reflect the actual size. The same reference numeral is assigned to the same or corresponding element in each drawing.

Advantages and features of the disclosure and methods of achieving the same will become clear with reference to the accompanying drawings and embodiments described below in detail. However, the disclosure is not limited to the following embodiments, and may be implemented in various different forms, and the embodiments are provided to make the disclosure complete and to completely inform those skilled in the art of the scope of the disclosure, and the disclosure is defined only by the scope of the claims. Through the specification, the same reference numeral refers to the same element.

It will be understood that each block of the flowchart illustrations and combinations of the flowchart illustrations can be implemented by computer program instructions. These computer program instructions may be loaded onto a general-purpose computer, special-purpose computer, or processor of other programmable data-processing apparatuses, such that the instructions which execute on the computer or the processor of other programmable data-processing apparatuses create a means for implementing the functions specified in the flowchart block(s). These computer program instructions may also be stored in a computer-readable memory that can direct a computer or other programmable data-processing apparatus to function in a particular manner such that the instructions stored in the computer-available or computer-readable memory produce an article of manufacture including instructions for implementing the function specified in the flowchart block(s). The computer program instructions may also be loaded onto a computer or other programmable data-processing apparatus to cause a series of operational steps to be performed on the computer or other programmable data-processing apparatus to produce a computer-implemented process such that the instructions executed on the computer or other programmable data-processing apparatus provide steps for implementing the functions specified in the flowchart block(s).

In this regard, each block may represent a module, segment, or portion of code, which includes one or more executable instructions for implementing the specified logical function(s). It should also be noted that, in some alternative implementations, the functions noted in the blocks may occur out of the order. For example, two successive blocks may be simultaneously performed substantially or may be performed in a reverse order according to the corresponding functions sometimes.

At this time, the term '~er' used in the present embodiment refers to software or a hardware component such as an FPGA or an ASIC and plays any role. However, the '~er' is not limited to software or hardware. The '~er' may be configured to be present in an addressable storage medium, and may also be configured to run on one or more processors. Accordingly, for example, the '~er' includes software components, object-oriented software components, components such as class components and task components, processors, functions, attributes, procedures, subroutines, segments of program code, drivers, firmware, microcode, circuits, data, databases, data structures, tables, arrays, and parameters. Functions provided in the elements and the '~ers' may be combined into a smaller number of elements and the '~ers' or divided into a larger number of elements and '~ers'. In addition, the elements and the '~ers' may be implemented to run on one or more CPUs in a device or secure multimedia card. In embodiments, the '~er' may include one or more processors.

Terms for identifying access nodes in the following description, terms referring to network entities, terms referring to messages, terms referring to interfaces between network entities, and terms referring to various pieces of identification information are used for convenience of description. Accordingly, the disclosure is not limited to the terms used in the disclosure, and other terms referring to entities having the equivalent technical meaning may be used.

For convenience of description, terms and names defined in the standard of the 5G, NR, or LTE system are used in the disclosure. However, the disclosure is not limited to the terms and names, and may be equally applied to systems following different standards. That is, in a detailed description of embodiments of the disclosure, the communication standard defined by the 3GPP may be a main target, but a main subject of the disclosure can be somewhat modified and applied to other communication systems having a similar technical background without departing from the scope of the disclosure, which can be determined by those skilled in the art of the disclosure.

FIG. 1 illustrates a wireless communication system according to various embodiments of the disclosure. A BS 110 and a UE 120 are illustrated as examples of the part of nodes using radio channels in a wireless communication system.

The BS 110 is a network infrastructure element that provides radio access to the UE 120. The BS 110 has coverage defined in a predetermined geographical area on the basis of the range within which a signal can be transmitted and received. The BS 110 may be referred to as 'access point (AP)', 'eNodeB (eNB)', '5th-generation (5G) node', 'G NodeB (next generation NodeB (gNB))', '5G NodeB (5gNB)', 'wireless point', 'transmission/reception point (TRP)', a 'digital unit (DU)', a 'radio unit (RU)', a 'remote radio head (RRH)', or other terms having an equivalent technical meaning, as well as a base station.

The UE 120 is a device used by a user and performs communication with the BS 110 through a radio channel. According to circumstances, the UE 120 may be operated without involvement of the user. That is, the UE 120 is a device performing machine type communication (MTC), and may not be carried by the user. The UE 120 may be referred to as 'user equipment (UE)', 'mobile station', 'subscriber station', 'remote terminal', 'wireless terminal', 'electronic device', 'user device', or other terms having the equivalent technical meaning, as well as a 'terminal'. The UE (for example, the UE 120) according to various embodiments of the disclosure may include at least one of, for example, a cellular phone, a smartphone, a computer, a tablet PC, a mobile phone, a video phone, an electronic book reader, a desktop PC, a laptop PC, a netbook computer, a workstation, a server, a PDA, a portable multimedia player (PMP), an MP3 player, a medical device, a camera, a wearable device, or a multimedia system capable of performing a communication function. Further, types of the UE are not limited to the above examples.

In order to increase a channel gain, the BS 110 or the UE 120 may perform beamforming. Beamforming may include transmission beamforming and reception beamforming. That is, the BS 110 or the UE 120 may assign directivity to a transmission signal or a reception signal. To this end, the BS 110 and the UE 120 may select serving beams through a beam search procedure or a beam management procedure. After the serving beams are selected, communication may be performed through resources having a quasi co-located relationship with resources through which the serving beams are transmitted. For example, the UE 120 and the BS 110 may transmit and receive a wireless signal in millimeter-wave (mmWave) bands (for example, 28 GHZ, 30 GHz, 38 GHz, and 60 GHz).

The UE 120 may perform a synchronization process and a cell search procedure through a primary synchronization signal (PSS), a secondary synchronization signal (SSS), and a physical broadcast channel (PBCH). Thereafter, the UE 120 may perform an access procedure in order to complete access to the network through the BS 110. The UE 120 may transmit a preamble through a physical random access channel (PRACH) and receive a response message of the preamble through a physical downlink control channel (PCCH) and a physical downlink shared channel (PDSCH). The UE performing the above-described procedure may receive a PDCCH/PDSCH and transmit a physical uplink shared channel (PUSCH)/physical uplink control channel (PUCCH) as a general uplink/downlink signal transmission procedure. The random access procedure may be used for various purposes such as initial access, uplink synchronization control, resource allocation, handover, and the like.

Referring to FIG. 1, according to movement of the UE, a BS which the UE accesses may be changed. The UE may perform a handover. BSs may be connected to some of neighboring BSs and may be connected to a mobile communication core network such as a core network (CN) (for example, evolved packet core (EPC) or 5G core network (5GC)). The BS may be a mobile communication BS which is irrelevant to a radio access technology such as LTE, NR, WiFi, or the like. The UE 120 may be connected to the BS 110 to receive a mobile communication service, and the UE and the BS may continuously receive the mobile communication service through a handover (HO) procedure in order to change the BS according to movement of the UE. A serving BS before movement may be referred to as a source BS (or a serving cell or a source cell) and a BS newly connected after movement may be referred to as a target BS (or a target cell).

A cell may refer to an area that one BS can cover. One BS may cover a single cell or multiple cells. The multiple cells may be divided by a frequency supporting multiple cells or an area of a covered sector. In the disclosure, the BS may be used as the term including a cell, and the cell may be used as the term referring to a BS. Hereinafter, the disclosure uses a source BS/target BS in order to describe a handover according to movement of the UE, but the expression having the same technical meaning such as a source cell/target cell or a serving cell/target cell can be replaced and used in embodiments of the disclosure.

Figure 2:
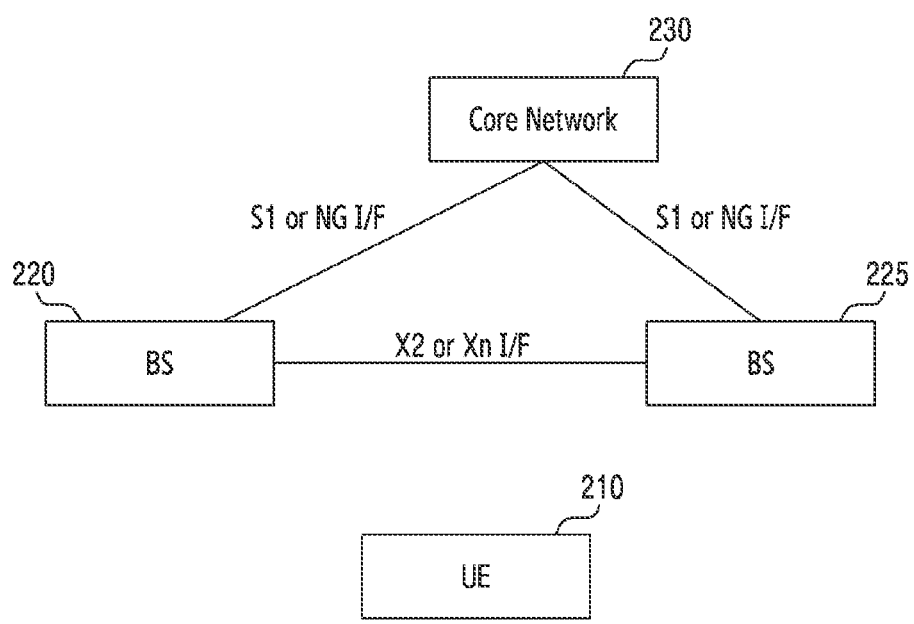
FIG. 2 illustrates an example of the structure of a wireless communication system according to various embodiments of the disclosure.

FIG. 2 illustrates an example of the structure of a wireless communication system according to various embodiments of the disclosure. In FIG. 2, an example of the structure of a mobile communication system to which various embodiments of the disclosure can be applied is illustrated.

Referring to FIG. 2, a BS 220 or a BS 225 may be connected to a core network (for example, evolved packet core (EPC) or 5G core network (5GC)). For example, the BS 220 or the BS 225 may be an LTE eNB or NR gNB. Alternatively, for example, the BS 220 or the BS 225 may be a mobile communication BS which is irrelevant to a radio access technology (RAT) such as a WiFi AP.

The BSs 220 and 225 may be configured as one unit or may be divided into a plurality of units. The BS configured in such a form supports each of the divided mobile communication functions Examples of the functions include a function for each PDCP/RLC/MAC/PHY/RF layer, one unit may support functions, a plurality of units may support the functions in a distributed manner, or one function may be supported by one or more divided units. BSs may be connected through an interface between BSs such as an X2 or Xn interface, and the BS may be connected to a CN through an interface between a BS and a core network such as an S1 or NG interface. The technology proposed in the disclosure can be applied when the UE may access the BS regardless of an internal configuration of the BS and a handover is performed during movement between BSs.

In a general handover procedure, a source BS determines a target BS according to an internal policy on the basis of measurement information (for example, a measurement report (MR)) transmitted from the UE and transmits configuration information (for example, RRC configuration) received from the target BS to the UE. The UE may access the target BS on the basis of the configuration information. Through such a process, the UE performs the handover from the source BS to the target BS. A detailed procedure is described with reference to FIG. 5.

Figure 3A:
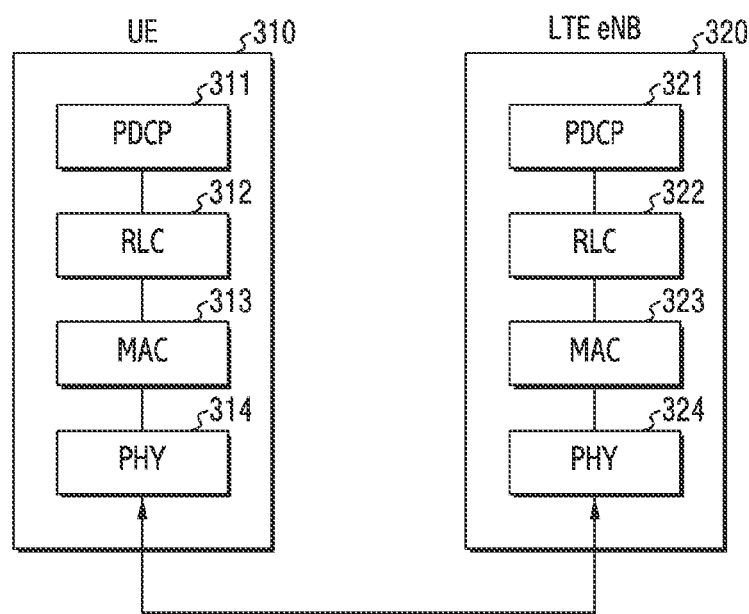
FIG. 3A illustrates an example of a wireless protocol structure in a long-term evolution (LTE) system according to various embodiments of the disclosure.

FIG. 3A illustrates an example of a wireless protocol structure in a long-term evolution (LTE) system according to various embodiments of the disclosure.

Referring to FIG. 3A, the UE and the BS include packet data convergence protocols (PDCPs) 311 and 321, radio link controls (RLCs) 312 and 322, medium access controls (MACs) 313 and 323, respectively, in the wireless protocol of the LTE system. The packet data convergence protocols (PDCPs) 311 and 321 perform an operation of compressing/reconstructing an IP header. The main functions of the PDCP are described below.

- Header compression and decompression function (Header compression and decompression: ROHC only)
- User data transmission function (transfer of user data)
- Sequential delivery function (in-sequence delivery of upper-layer PDUs at PDCP reestablishment procedure for RLC AM)
- Sequence re-arrangement function (For split bearers in DC (only support for RLC AM): PDCP PDU routing for transmission and PDCP PDU reordering for reception)
- Duplicate detection function (duplicate detection of lower-layer SDUs at PDCP reestablishment procedure for RLC AM)
- Retransmission function (retransmission of PDCP SDUs at handover and, for split bearers in DC, of PDCP PDUs at PDCP data recovery procedure, for RLC AM)
- Ciphering and deciphering function (Ciphering and deciphering)
- Timer-based SDU removal function (timer-based SDU discard in uplink)

Radio Link Control (RLC) 312 or 322 reconfigures the PDCP packet data unit (PDU) to be the proper size and performs an ARQ operation. The main functions of the RLC are summarized below.

- Data transmission function (transfer of upper-layer PDUs)
- ARQ function (Error Correction through ARQ (only for AM data transfer))
- Concatenation, segmentation, and reassembly function (Concatenation, segmentation and reassembly of RLC SDUs (only for UM and AM data transfer))
- Re-segmentation function (re-segmentation of RLC data PDUs (only for AM data transfer))
- Reordering function (reordering of RLC data PDUs (only for UM and AM data transfer))
- Duplication detection function (duplicate detection (only for UM and AM data transfer))
- Error detection function (protocol error detection (only for AM data transfer))
- RLC SDU deletion function (RLC SDU discard (only for UM and AM data transfer))
- RLC reestablishment function (RLC reestablishment)

The MACs 313 and 323 are connected with various RLC layer devices included in one UE, and perform an operation for multiplexing RLC PDUs to the MAC PDU and demultiplexing the RLC PDUs from the MAC PDU. The main functions of the MAC are summarized below.

- Mapping function (Mapping between logical channels and transport channels)
- Multiplexing and demultiplexing function (Multiplexing/demultiplexing of MAC SDUs belonging to one or multiple different logical channels into/from Transport Blocks (TBs) delivered to/from the physical layer on transport channels)

Scheduling information report function (scheduling information reporting)

HARQ function (error correction through HARQ)

Logical channel priority control function (priority handling between logical channels of one UE)

UE priority control function (priority handling between UEs by means of dynamic scheduling)

MBMS service identification function (MBMS service identification)

Transport format selection function (transport format selection)

Padding function (padding)

The physical layers 314 and 324 perform an operation for channel-coding and modulating higher-layer data to generate an OFDM symbol and transmitting the OFDM symbol through a radio channel or demodulating and channel-decoding the OFDM symbol received through a radio channel and transmitting the demodulated and channel-decoded OFDM symbol to a higher layer.

Figure 3B:
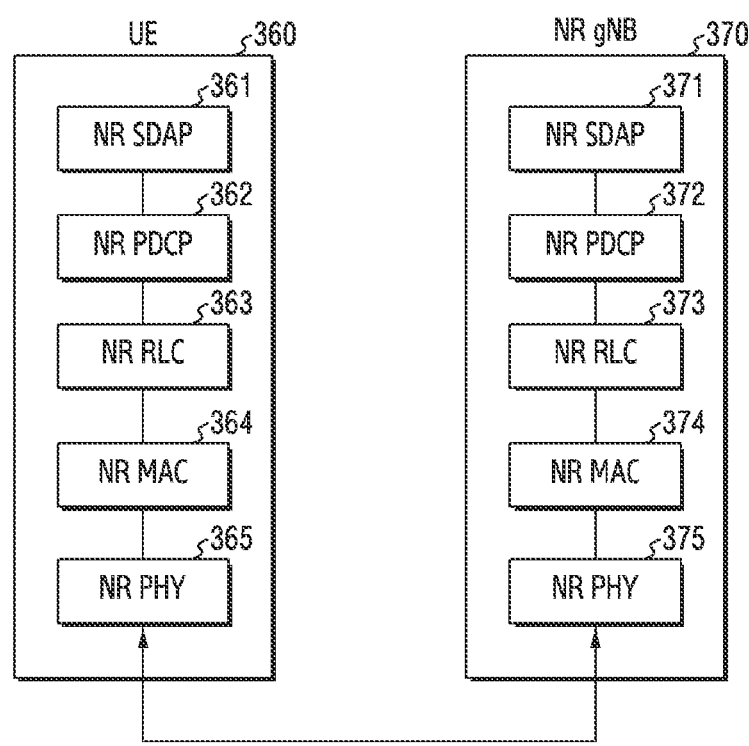
FIG. 3B illustrates an example of a wireless protocol structure in a next-generation mobile according to various embodiments of the disclosure.

FIG. 3B illustrates an example of a wireless protocol structure in a next-generation mobile according to various embodiments of the disclosure. NR of the 3GPP may be considered as examples of the next-generation mobile communication.

Referring to FIG. 3B, the UE and the NR gNB include NR SDAPs 361 and 371, NR PDCPs 362 and 372, NR RLCs 363 and 373, and NR MACs 364 and 374 in the wireless protocol of the next-generation mobile communication system.

Main functions of the NR SDAPs 361 and 371 may include some of the following functions.

Function of transmitting user data (transfer of user-plane data)

Function of mapping QoS flow and a data bearer for uplink and downlink (mapping between a QoS flow and a DRB for both DL and UL)

Function of marking a QoS flow ID for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCPs 362 and 372 may include some of the following functions.

Header compression and decompression function (Header compression and decompression. ROHC only)

User data transmission function (transfer of user data)

Sequential delivery function (in-sequence delivery of upper-layer PDUs)

Non-sequential delivery function (out-of-sequence delivery of upper-layer PDUs)

Reordering function (PDCP PDU reordering for reception)

Duplicate detection function (duplicate detection of lower-layer SDUs)

Retransmission function (retransmission of PDCP SDUs)

Ciphering and deciphering function (Ciphering and deciphering)

Timer-based SDU removal function (timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the reordered data without regard to the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLCs 363 and 373 may include some of the following functions.

Data transmission function (transfer of upper-layer PDUs)

Sequential delivery function (in-sequence delivery of upper-layer PDUs)

Non-sequential delivery function (out-of-sequence delivery of upper-layer PDUs)

ARQ function (error correction through ARQ)

Concatenation, segmentation, and reassembly function (concatenation, segmentation and reassembly of RLC SDUs)

Re-segmentation function (re-segmentation of RLC data PDUs)

Reordering function (reordering of RLC data PDUs)

Duplicate detection function (duplicate detection)

Error detection function (protocol error detection)

RLC SDU deletion function (RLC SDU discard)

RLC reestablishment function (RLC reestablishment)

The sequential delivery function (In-sequence delivery) of the NR RLC device is a function of sequentially transferring RLC PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer if a predetermined timer expires when there is a lost RLC SDU, a function of sequentially transferring all RLC SDUs received before the timer starts to the higher layer, or if a predetermined timer expires when there is a lost RLC SDU, and a function of sequentially transferring all RLC SDUs received up to that point in time to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 364 and 374 may be connected to a plurality of NR RLC layer devices configured in one UE, and the main functions of the NR MACs may include some of the following functions.

Mapping function (Mapping between logical channels and transport channels)
Multiplexing and demultiplexing function (multiplexing/demultiplexing of MAC SDUs)
Scheduling information report function (scheduling information reporting)
HARQ function (error correction through HARQ)
Logical channel priority control function (priority handling between logical channels of one UE)
UE priority control function (priority handling between UEs by means of dynamic scheduling)
MBMS service identification function (MBMS service identification)
Transport format selection function (transport format selection)
Padding function (padding)

The NR PHY layers 365 and 375 provide an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

The disclosure relates to a handover in a wireless communication system and, more particularly, to an apparatus, a method, and a system for performing a handover on the basis of artificial intelligence (AI). In the 3GPP standard, a handover based on a measurement report (MR) is defined (hereinafter, referred to as an MR-based handover). The UE periodically or aperiodically measures a channel quality of a cell and, when a predefined condition (for example, A3 event) is satisfied, transmits an MR including the measurement result to the serving BS. The measurement result may include a measurement result for the target cell. That is, the serving BS determine whether to perform the handover from the serving BS (that is, the source BS) to the target BS on the basis of the MR. However, the current standard has a problem in that an individual situation such as a BS condition of path loss or a shaded area (shadowing) due to obstacles in a surrounding environment or a condition of the UE moving at a high speed cannot be considered and an optimal handover algorithm cannot be provided to the BS or the UE since a measurement report condition is comprehensively defined.

In order to solve the problem, various embodiments of the disclosure propose a handover scheme in which a measurement report is made according to a predefined condition in the standard and the handover is performed according to a neural network configured to make a determination related to the handover (for example, cell selection, whether to perform the handover, or measurement) rather than performing according to a determination by the BS. The handover performed according to a neural model which has been configured may be hereinafter referred to as an AI-based handover. The AI-based handover procedure may include a scheme for transmitting the configured neural network model to the UE, a procedure for making a request for a handover to a target cell identified according to the configured model to a serving cell, or a learning procedure for updating the configured neural network mode.

AI is a technology for implementing a learning ability, an inference ability, a perception ability, and a natural language understanding ability in the form of a program to have intelligence similar to human. The BS or the UE may perform a handover procedure in which case there are various determinations such as a determination about whether a measurement report condition is satisfied, whether a handover is performed, selection of a target cell, and a configuration of a threshold value in the handover procedure. The determination about the handover procedure is not performed with a predetermined condition equation or a unified reference, and when the determination is performed on the basis of AI, the best result may be acquired in the light of a person such as a user or an operator. As a better quality of data is accumulated and construction of a neural network model which is a determination reference is more consistent with reality, a handover determination based on an AI algorithm may be more accurate for a situation that the UE or the BS individually faces. Hereinafter, FIG. 4 illustrates a neural network model for implementing the AI-based handover.

Figure 4:
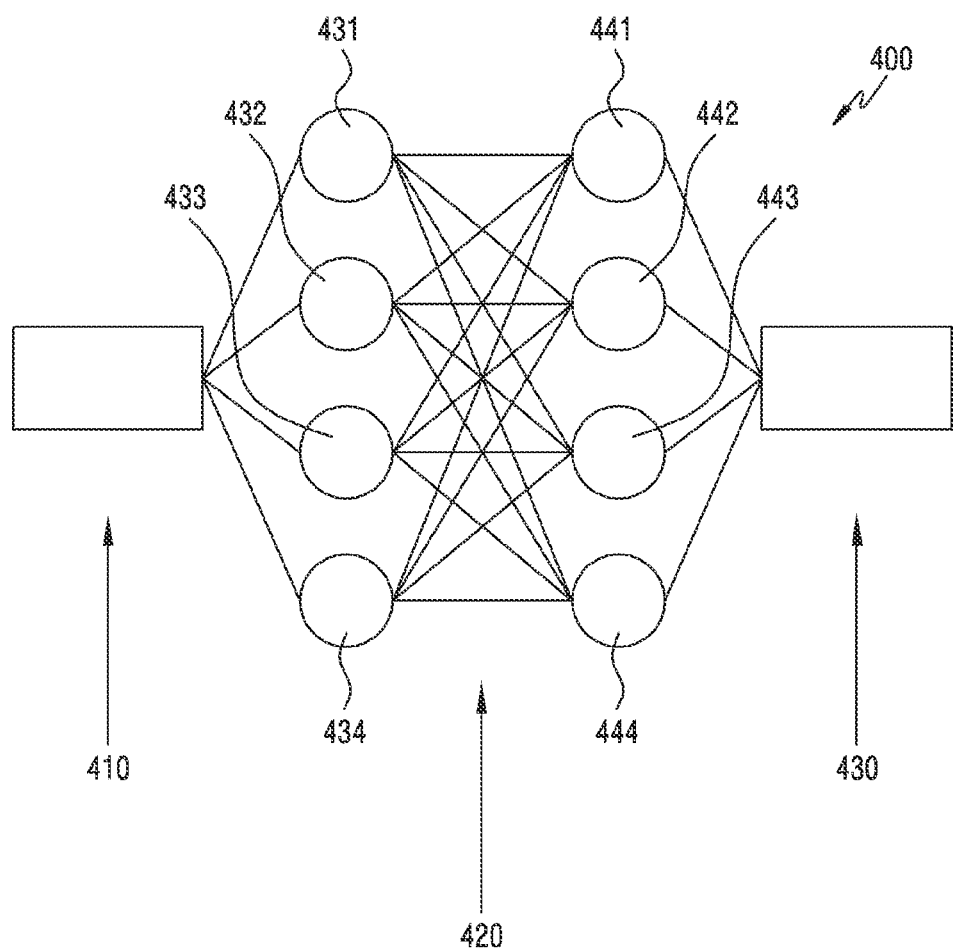
FIG. 4 illustrates an example of a configuration of the AI-based handover according to various embodiments of the disclosure.

FIG. 4 illustrates an example of a configuration of the AI-based handover according to various embodiments of the disclosure. In order to implement the AI-based handover, a neural network 400 is configured.

Referring to FIG. 4, the neural network 400 may include an input area 410, an operation area 420, and an output area 430. The input area 410 may be referred to as an input layer. The operation area 420 may be referred to as a hidden layer. The output area 430 may be referred to as an output layer.

The operation area 420 may include one or more nodes. The nodes may be factors which are targets to be determined. The determination may be decided on the basis of a probability. The probability may be expressed as a weight. For example, referring to the operation area 420, two hidden layers may be included. A first hidden layer may include a first node 431, a second node 432, a third node 433, and a fourth node 434. A second hidden layer may include a fifth node 441, a sixth node 442, a seventh node 443, and an eighth node 444. A weight from the first node 431 to the sixth node 442 may indicate an influence on a determination of the first node 431 by a determination of the sixth node 442. Values obtained by values of nodes connected to the sixth node 442 by the weight from the corresponding nodes to the sixth node 442 may be calculated for all nodes connected to the sixth node 442, and a determination value to the sixth node 442 may be acquired through operations (for example, addition and bias configuration) for the calculated values. The weight within the straight line may be, for example, a prior probability for a specific event or a posterior probability for an event generated on the basis of premise of a specific event.

The neural network 400 may provide a specific output result according to an input value. When an input value is input like a predetermined function, a device receiving information for configuring the neural network 400 (hereinafter, referred to as neural network configuration information) may acquire an output value. The neural network configuration information may include information on a neural network (NN) structure defining the connection relation between nodes (hereinafter, referred to as structure information and expressed as an NN for convenience of description) and information on a weight between nodes in the structure (hereinafter, referred to as weight information and expressed as W for convenience of description). The device may acquire an output result from the input value on the basis of the structure information and the weight information. For example, the device may acquire the output result according to a sum of weights-product between nodes after the weight product operation for each node and the operation between hidden layers. The output result may include a parameter related to the purpose of including the neural network 400. For example, in the case of the AI-based handover, the input may be a channel quality for the cell and the output may be whether the corresponding cell is a handover target cell.

The neural network 400 according to various embodiments may be configured for the AI handover. The structure information and the weight information provided to configure the AI handover may be related to the handover.

The structure information may include a structure of node for each of the determinations that can be considered to perform the handover from the current serving cell to the target cell. For example, the node may indicate a determination for identifying a target cell, a determination for comparing a serving cell with at least one neighbor cell, a determination of metric for comparing a serving cell with a neighbor cell, relevant with a specific cell (for example, geographical relevance or channel quality intensity), or a determination of occurrence of pingpong.

The weight information may indicate a degree of influence between determinations that can be considered when a handover from the current serving cell to the target cell is performed. The weight information may include values for defining influence between nodes for the handover determination. According to an embodiment, the weight information may be dependent on structure information. At this time, a transmission period of the structure information may be longer than a transmission period of the weight information. For example, when the transmission period of the structure information is T1 and the transmission period of the weight information is T2, T1 may be longer than T2. At this time, T1 may be a multiple of T2. That is, the structure information may be related to long-term parameters in the determination related to the AI handover, and the weight information may be related to short-term parameters in the determination related to the AI handover. According to another embodiment, the weight information may be configured independently from the structure information. For example, for the weight information, a mapping table including weight values between nodes may be defined and a neural network structure to be used for the actual AI handover may be acquired according to structure information transmitted thereafter.

Meanwhile, FIG. 4 illustrates that the input area 410 provides one variable as an input and the output area 430 provides one result for nodes of respective layers as an output, but is it only an example, and various embodiments of the disclosure are not limited to the case in which the neural network model necessarily needs only one input value or provides only one output value. According to an embodiment, the neural network 400 for the AI-based handover may require a plurality of input values. For example, the neural network for the AI-based handover may consider a channel quality of the current serving cell, a channel quality of the target cell, and a type of the serving cell (for example, whether the serving cell is a small cell or an RAT type) as an input. Further, according to an embodiment, the neural network 400 for the AI-based handover may provide a plurality of output values. For example, the neural network for the AI-based handover may indicate a plurality of target cells to which the handover can be performed.

A handover method suitable for a cell-specific environment (or UE environment) may be needed. Every cell may have a difference environment (for example, geographical environment, access environment, or the number of users) and different radio signal intensity distribution. Accordingly, a separate AI structure for learning each cell environment may be needed.

In order to construct a more accurate environment, a large amount of learning may be required. The UE may use a larger amount of radio signal information than the BS in real time. When a measurement report period is longer than a signal measurement period of the UE, the BS detects an environment of the cell through the measurement report transmitted by the UE, and thus an amount of information collected by the UE may be larger than an amount of information collected by the BS. Accordingly, it is possible to apply learning in real time to the neural network structure designed through the measurement result of the UE through feedback. Further, when the performance deteriorates due to an environment change, the performance of the AI-based handover can be improved through continuous feedback after switching to the general handover. An efficient handover may be achieved by applying an AI-based handover determination method to a wireless communication system between the BS and the UE through a combination of cell information and measurement information or environment information of the UE.

A channel quality may be acquired by measuring a received signal. Hereinafter, as metric indicating the channel quality, reference signal received power (RSRP) is described as an example, but beam reference signal received power (BRSRP), reference signal received quality (RSRQ), received signal strength indicator (RSSI), signal to noise ratio (SNR), signal to interference and noise ratio (SINR), carrier to interference and noise ratio (CINR), error vector magnitude (EVM), bit error rate (BER), block error rate (BLER), other terms having the technical meaning equivalent thereto, or indexes indicating a channel quality may be additionally used.

Hereinafter, the conventional handover procedure, parts to which AI is applied in the handover procedure, and relevant signaling are described with reference to FIGS. 5 to 6B. When it is determined whether to perform the AI handover and the AI handover is not performed, operations for performing the conventional handover may also be understood as an embodiment of the disclosure.

Figure 5:
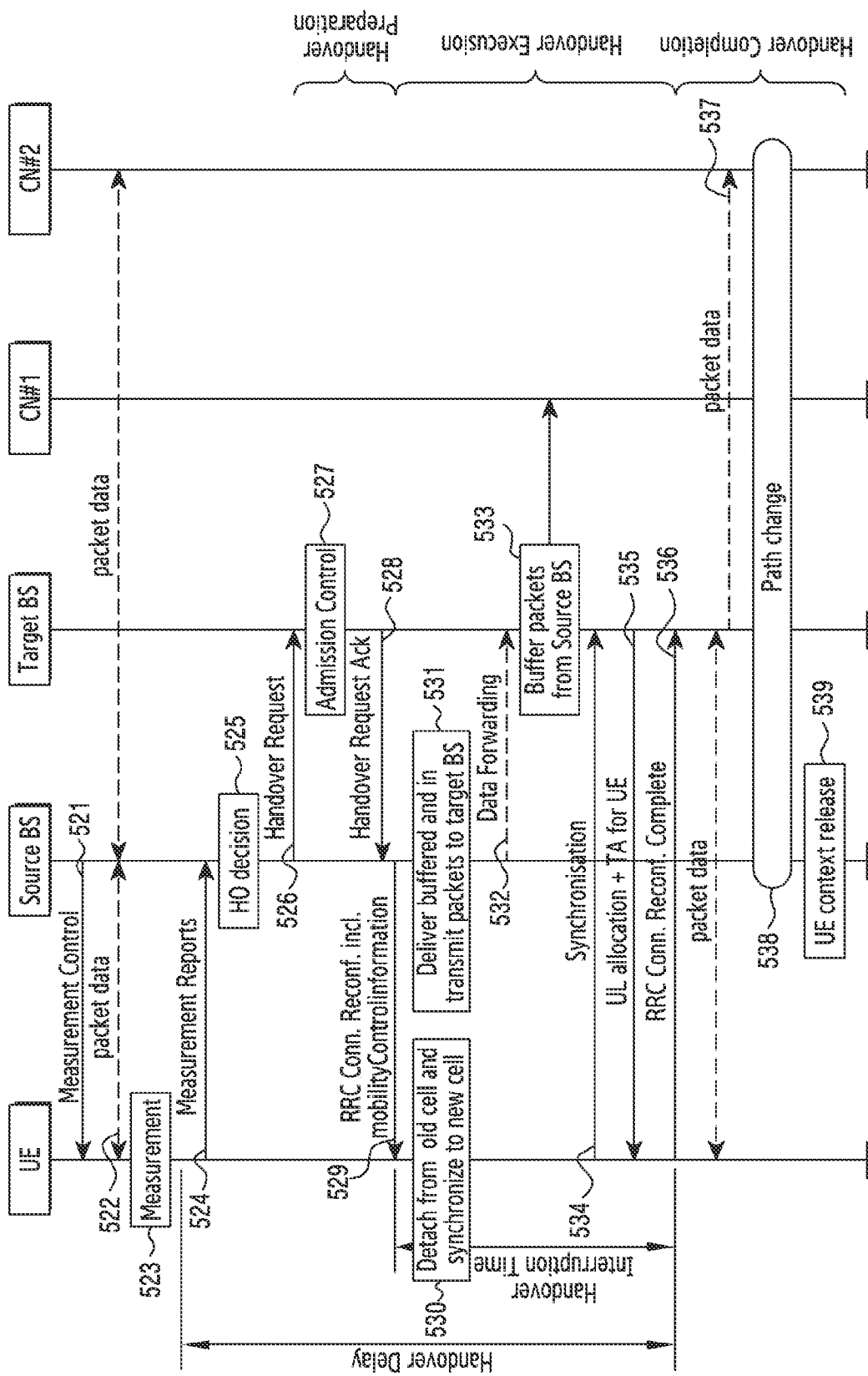
FIG. 5 illustrates an example of the conventional handover procedure.

FIG. 5 illustrates an example of the conventional handover procedure. The conventional handover refers to a handover procedure controlled by the BS according to a measurement report (MR) of the UE in the 3GPP standard. Hereinafter, the conventional handover may be referred to as a general handover or an MR-based handover to be distinguished from the AI-based handover described below. However, the AI-based handover does not exclude the use of the MR.

Referring to FIG. 5, in the general handover procedure, a source BS determines a target BS according to an internal policy on the basis of measurement information (for example, a measurement report) transmitted from the UE and transmits configuration information (for example, RRC configuration) received from the target BS to the UE. The UE may be connected to the target BS on the basis of the configuration information. Through such a process, the UE performs the handover from the source BS to the target BS. A detailed process is described below.

The source BS (base station) transmits measurement control information 521. The measurement control information provided by the source BS is used to control mobility of the UE. Thereafter, according to normal communication, data communication (packet data) 522 is performed. The UE measures a radio signal intensity of cells of neighboring BSs in operation 523 and, when a condition is satisfied by the measurement control 521, transmits a measurement report 524 to the source BS. When receiving the measurement report 524, the source BS properly determines and decides to hand off the UE in operation 525. The source BS transmits a handover request 526 message for transmitting information required for preparation of the handoff to the target BS to the target BS. The target BS performs admission control 527 for determining whether to allow the handover. In the process, the target BS configures resources required for the connection of the UE to the target BS. When the preparation for the HO is completed, the target BS transmits handover request acknowledgement (ack) 528 including the information required for the connection of the UE to the target BS. The handover request ack message includes radio connection reconfiguration message information received from the target BS, and the source BS transmits an RRC connection reconfiguration message 529 including the radio connection reconfiguration message information received from the target BS to the UE. When receiving the RRCConnectionReconfiguration 529 message including a parameter required for the handoff, the UE detaches from a previous cell and performs synchronization 530 for access to a new cell. Further, the source BS transmits a received packet to the target BS in operations 531 and 532. The target BS receives the packet from the source BS. The target BS may store the received packet in a buffer in operation 533. The UE performs synchronization 534 for the target BS and accesses the target BS through an RACH. The target BS allocates UL resources and responds through timing advance (TA) (for example, Msg 2 of random access) in operation 535. The UE transmits RRCConnectionReconfigurationComplete 536 to display completion of the handover. Thereafter, the UE may receive packet data through the target BS in operation 537. The packet data may be transferred to a second CN entity (for example, a serving gateway (S-GW) or a user plane function (UPF)). The target BS performs a path change procedure 538 with a first CN entity (for example, a mobile management entity (MME) or authentication (AMF)) in order to inform that the UE changed the cell. The target BS may transmit a path switch request to the first CN entity. When receiving a UE context release message from the CN, the source BS performs UE context release 539.

The problem to be solved by the disclosure is that an efficient handover is not performed for each state/environment of the UE since, when the conventional handover is performed as illustrated in FIG. 5, a measurement control/report is made on the basis of a representative BS/UE situation and a mobility parameter is designed on the basis of a representative BS/UE situation based on the information. In the disclosure, the UE receives handover-related reference information from the BS, but each UE may make a handover determination on the basis of more frequent information by performing analysis on the basis of directly received or measured information without transmitting a radio signal to the BS. Further, in the disclosure, the UE determines the handover on the basis of the directly received or measured information, and thus a handover suitable for each UE state/environment can be provided.

The problem to be solved by the disclosure is that a handover delay is generated according to a reactive operation of transmitting a measurement report to the BS when a measurement result satisfies a specific condition, for example, an MR trigger event A1, A2, or A3 defined in 3GPP TS 36.213 in the conventional handover as illustrated in FIG. 5. Further, according to the delay of the handover, a radio signal intensity may deteriorate.

In order to solve the above problems, in the disclosure, the BS may transmit a method used for determining a handover to the UE and the UE may determine a handover in consideration of a UE state/environment on the basis of directly received or measured information. For example, the UE may use an artificial intelligence (AI)-based method using a neural network (NN) for determining the handover. The neural network 400 of FIG. 4 may be used as example of the neural network. Information related to the neural network (NN) means the structure of the NN (the structure information of FIG. 4), weights used for calculations (the weight information of FIG. 4), and whole the overall information required for calculations through the NN. In an embodiment, for example, the information related to the neural network may narrowly mean only the NN structure itself.

The problem to be solved by the disclosure is a delay of information generated according to transmission of information measured by the UE to the BS through a measurement report in the conventional handover as illustrated in FIG. 5. When the BS receives the measurement report, the corresponding information becomes already delayed information by a time during which the UE measured the corresponding information and the BS received the measurement report. Accordingly, the determination of the handover is performed on the basis of delayed information. Such a delay may cause an inaccurate handover. Accordingly, in various embodiments of the disclosure, the UE may use information which the UE directly received and measured for determining the handover in real time, thereby more accurately reflecting an individual state/environment of the UE to determine whether to perform the handover.

Analysis for the AI-based handover may require a large amount of calculations. In order to be more optimized for an actual UE situation or an actual BS situation through the neural network structure for the AI-based handover, the neural network model may be configured through calculations of the BS but the result according to an input value and an output value may be controlled by the UE. The handover-related analysis is performed by the UE, and thus there is an advantage in that a large amount of calculations required by the BS is distributed to the UE.

The problem to be solved by the disclosure is a handover method that is not optimized for a BS environment. A downloadable neural network (NN) proposed in the disclosure may be configured as an optimally learned value for each BS (or each cell) on the basis of feedback of learning information through a plurality of UEs. The NN has information obtained by learning the BS environment. The UE may receive the neural network information, that is, the NN from the BS and use the same for analyzing the handover, thereby performing an optimized handover in spite of an initially accessed BS.

Further, the problem to be solved by the disclosure is that the handover using the NN does not operate well. When the NN is not learned well, the handover is not optimized.

Accordingly, the AI-based handover using the NN is used only when an error of the performance of the NN is smaller than a reference value (for example, AIHOthreshold), and the conventional handover is used to reduce the error through learning when the error is larger than the reference value.

Hereinafter, examples of signaling between the BS and the UE, operations, and the neural network structure for the AI-based handover are described.

Figure 6A:
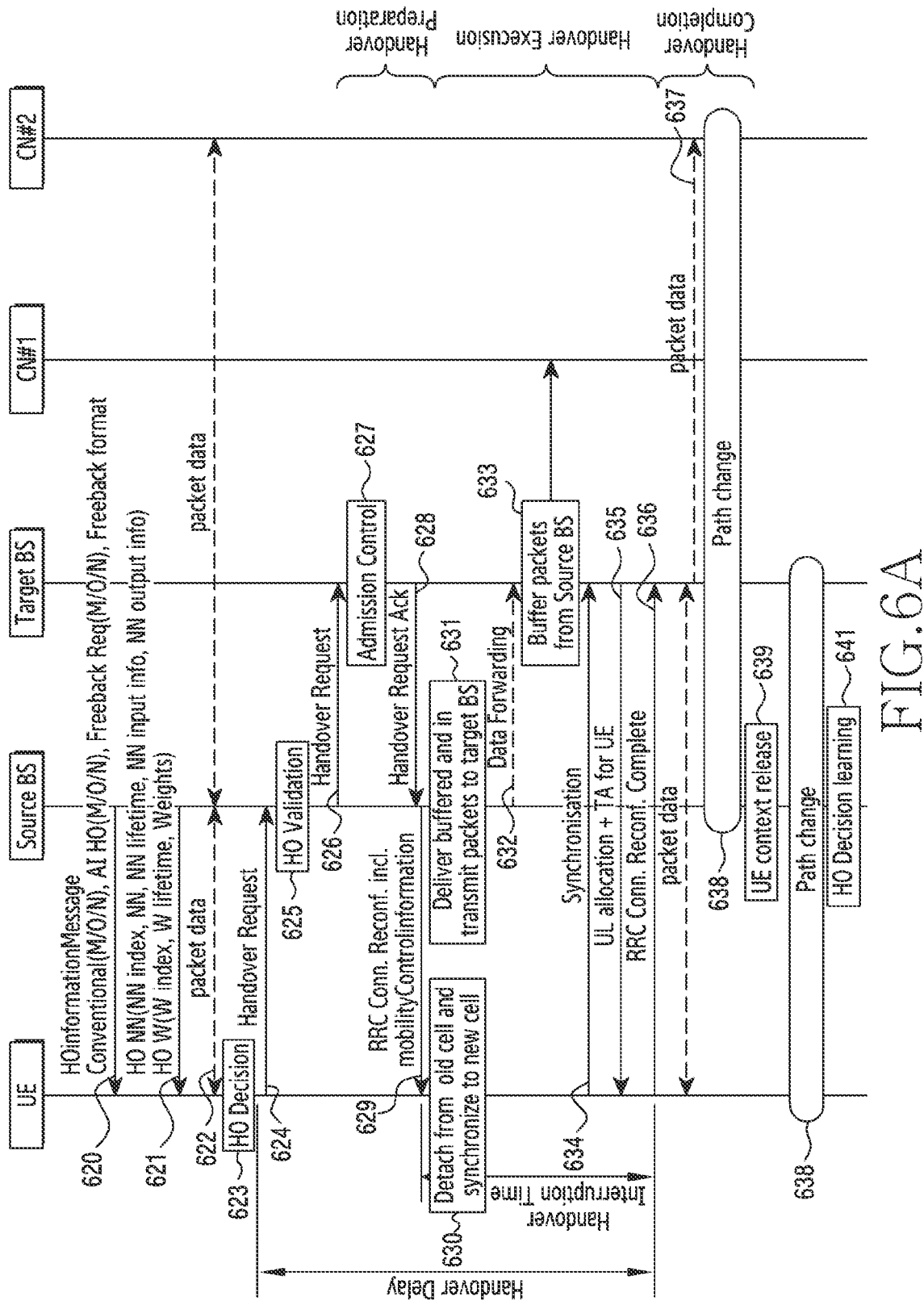
FIG. 6A illustrates an example of an AI-based handover procedure according to various embodiments of the disclosure.

FIG. 6A illustrates an example of an AI-based handover procedure according to various embodiments of the disclosure. A handover procedure using a neural network (NN) which can be downloaded, that is, acquired from the BS is illustrated with reference to FIG. 6A. It may be identified that a detailed procedure is different from the conventional handover of FIG. 5. Accordingly, parameters and signaling procedures related to the handover distinguished from the conventional handover may be considered.

Referring to FIG. 6, the BS may transmit information related to the handover (hereinafter, referred to as handover information) to the UE in operation 620. The handover information may indicate the type of the handover (for example, MR-based handover or AI-based handover). The handover information may be the same for all BSs or may be different for each BS, and a configuration method for each BS may be determined by a policy of a network operator operating the system in detail. According to an embodiment, the handover information may include the following detailed information.

Conventional HO: Mandatory (M), Optional (O), None (N)
AI HO: Mandatory (M), Optional (O), None (N)
Feedback Request: Mandatory (M), Optional (O), None (N)
Feedback format (Feedback Request is M or O)
- NN input info: input value information of HO NN, for example, wireless signal intensity (RSRP, RSRP, SINR, or the like)
- NN output info: output value format of NN, for example, the existence of non-existence of HO or the existence of non-existence of HO of serving cell and one or more neighboring cells
- Performance: performance reference of HO, for example, maximization of wireless signal for predetermined period or minimization of pingpong (UE generates NN output info value according to HO performance reference value which is performance value of feedback)
- Training data period: NN input collection period (that is, NN learning data collection period)
- Training data start time: NN learning data collection start time point
- Training data end time: NN learning data collection end time point The conventional HO informs whether the handover in the mobile communication system such as conventional LTE/NR, that is, the MR-based handover is used. When the corresponding value is mandatory, it means that the conventional handover is used. When the value is optional, it means that the handover may be performed through the conventional handover procedure (on the basis of a measurement report). None means that the conventional handover is not used. The AI HO informs whether the downloadable neural network (NN)-based handover is used. When the corresponding value is mandatory, it means that the NN and weights are downloaded and used. When the value is optional, it means that the handover through AI is supported and the UE may selectively use the AI-based handover. None means that the AI-based handover is not used.

A feedback request is a value of which the BS informs in order to allow the UE to transmit learning information related to the handover for learning. The UE transmits learning information to the BS in the future on the basis of detailed information of the feedback format transmitted together. Mandatory means that the UE should necessarily feed back information required for learning. Optional means selective feedback. None means no feedback.

The feedback format indicates a transmission format in which the UE feeds back handover learning data. In other words, the feedback format indicates which information is fed back for AI learning. NN input info is input value information of the handover NN used for the handover. For example, the radio signal intensity such as RSRP, RSRP, or SINR may be used as the input value. Further, for example, throughput may be the input value. In addition, for example, the input value may include the radio signal intensity and the throughput. The parameters are only examples, and other parameters as well as the input values can be used in various embodiments of the disclosure. The parameters may be parameters (for example, measurement through an SRS, CQI, or the like) which can be measured through a radio signal, that is, all parameters which can be acquired by the UE. NN output info may be an output value format of the HO NN. The UE generates an NN output info value according to an NO performance reference value which is a performance value. For example, when maximization of an RSRP value for a predetermined time period is aimed, the UE may add RSRP values of each BS for a predetermined time period after the handover and generate learning data to output a maximum BS(cell). An output value may be provided immediately after the corresponding condition is satisfied, when the condition is satisfied successively a predetermined number of times, when the condition is satisfied at a predetermined rate or more for a predetermined time, or when the condition continues for a predetermined time.

Although maximization of the RSRP value for a predetermined time has been described as an example of the performance reference, various types of performance may be considered. For example, one or more of the following information of the performance reference value may be considered.

Maximization of a sum of expected radio signal intensities for an optimal HO measurement period
Maximization of a sum of values obtained by multiplying weights by expected radio signal intensities for an optimal HO measurement period
Maximization of expected throughput for an optimal HO measurement period
Minimization of a pingpong time
Radio signal intensities/throughput penalty weights in pingpong
Minimization of a handover interruption time
Radio signal intensity of the serving BS+margin<radio signal intensity of the target BS A radio signal in the radio signal intensity refers to radio signal information which the UE can measure and may be a combination of one of more of the information RSRP, RSRQ, RSSI, and SINR. The radio signal information may include a channel quality for a cell or parameters for determining a channel quality for a cell. The weights may be determined according to an implementation method and, for example, determined according to a time or whether pingpong is performed.

A training data period means a period of recording of NN learning data (input value/output value). A training data start time means an NN learning data collection start time point and a training data end time means an NN learning data collection end time point. The UE records an input value and an output value measured in units of training data periods between the training data start time and the training data end time. The feedback format is an example of transmitting information for learning the NN, and may mean a set of data for learning the NN through the input value/output value according to an embodiment.

Although it has been described and illustrated that the handover information HOinformationMessage) includes whether the conventional handover is performed, whether the AI-based handover is performed, whether feedback is made, and a feedback format, various embodiments of the disclosure are not limited thereto. That is, the handover information may include at least one of the information rather than including all of the information. According to an embodiment, whether the feedback is made and the feedback format may not be indicated through the handover information. Further, according to an embodiment, only whether the AI handover is performed may be indicated, and whether the MR-based handover is performed may be indirectly indicated therethrough.

The BS may transmit neural network information for the AI-based handover to the UE in operation 621. The neural network information may include structure information (NN) related to the structure between nodes within the neural network and weight information (W) related to the weights between nodes. The BS transmits NN and weight information 621 (HO NN and HO W) for the AI handover to the UE. The handover NN and the weight information mean information which can be used by the UE for determining the handover using artificial intelligence (AI). Whether to perform the handover through the neural network information may be determined immediately after the corresponding condition is satisfied, when the condition is satisfied successively a predetermined number of times, when the condition is satisfied at a predetermined rate or more for a predetermined time, or when the condition continues for a predetermined time. For example, the predetermined condition may include one or more pieces of the following information.

Maximization of a sum of expected radio signal intensities for an optimal HO measurement period Maximization of a sum of values obtained by multiplying weights by expected radio signal intensities for an optimal HO measurement period Maximization of expected throughput for an optimal HO measurement period Minimization of a pingpong time Radio signal intensities/throughput penalty weights in pingpong ($0 \leq \alpha \leq 1$)

Minimization of a handover interruption time

Radio signal intensity of the serving BS+margin<radio signal intensity of the target BS A radio signal in the radio signal intensity refers to radio signal information which the UE can measure and may be a combination of one or more of the information RSRP, RSRQ, RSSI, and SINR. The weights may be determined according to an implementation method and, for example, determined according to whether pingpong is performed.

Thereafter, the BS transmits the NN to be used for the handover and weight information thereof to the UE. The structure information for the neural network may include at least one piece of the following information.

NN index: NN index used for the HO (the index increases when the NN is updated)

NN: NN used for the HO

NN lifetime: lifetime of the corresponding NN

NN input info: input value of the NN (for example, radio signal intensity list)

NN output info: output value of the NN (for example, the existence or nonexistence of the HO (one-hot encoding) or a cell ID) {HO, not HO}, Ex2, {Serving cell, Neighbor cell1(Cell ID), Neighbor cell2, . . . }

The weight information for the neural network may include at least one piece of the following information.

W index: weights index used for the HO (the index increases when the weight is updated)

W lifetime: lifetime of the corresponding weight

Weights: weight value used for the HO NN

The NN is a value indicating the structure between nodes included in the neural network in the neural network model and may be information distinguished from the weights between connected nodes. Although FIG. 6 illustrates that the weight information and the structure information are transmitted together, embodiments of the disclosure are not limited thereto. In an embodiment, the weight information and the structure information may be transmitted from the BS to the UE through one message. In another embodiment, the weight information and the structure information may be independently transmitted through independent configuration messages. For example, periods of transmission of the structure information (NN) and the weight information (W) may be independently configured. The transmission period of the structure information may be configured to be longer than the transmission period of the weight information.

According to normal communication, data communication (packet data) 622 is performed. The UE may measure a radio signal intensity through a handover decision module 623 (HO decision) and when, a predetermined condition is satisfied by a handover NN 621, transmit a handover request (HO request) 624 to the source BS.

When the UE makes a handover request 624, the source BS may verify whether the handover request to the target cell indicated by the handover request is valid. That is, the handover request is transmitted while including information that should be included to be verified by the target BS. When receiving the HO request in operation 624, the source BS may identify information transmitted from the UE and perform HO validation in operation 625. The HO request 624 may contain an included NN index, W index, NN input list, and target cell ID. The NN index may indicate a number of neural network structure (NN) used for determining the HO, and the Windex may indicate a number of a set (W) of weight values used for determining the HO In the HO validation operation 625, the BS may identify the NN and the W used for the HO as the NN index and the W index through information included in the HO request and identify whether the result of the NN output obtained by inputting the value of the NN input list into the corresponding NN matches information corresponding to a target cell ID transmitted by the UE. That is, the BS provided the neural network information, and thus may verify whether the input value and the output value of the UE are valid according to the provided neural network information.

When the target cell ID is different from the output result of the NN in validation, the source BS may determine HO validation failure. When the target cell ID is the same as the output result of the NN in validation, the source BS determines that the request is normal. Thereafter, the BS may select whether to perform the HO or not perform the HO according to a situation of the BS, a situation of the network (for example, load balancing, UE QoS, or the like), and selection of the BS in operation 626 in response to HO request.

When the handover is determined, the source BS may perform a handover procedure. The source BS transmits a handover request 626 message of transmitting information required for preparing the handover to the target BS. The target BS may perform admission control of determining whether to accept the handover in operation 627. In such a process, the target BS configures resources required for connecting the UE to the target BS. When the preparation for the HO is completed, the target BS transmits handover request 628 including the information required for the connection of the UE to the target BS. The UE receives an RRCConnectionReconfiguration 629 message including parameters required for handoff, and the source BS transmits an HO command to perform the HO. The UE may detach from a previous cell and perform synchronization 630 in order to access a new cell. Further, the source BS may transmit a packet 631 located in the received buffer to the target BS in operation 632. In addition, the target BS receives the packet from the source BS. The target BS may store the received packet in the buffer in operation 633. The UE may perform synchronization 634 for the target BS and access the target BS through an RACH. The target BS allocates a UL grant through an RAR of the random access procedure and responds through a TA. The UE transmits RRCConnectionReconfigurationComplete 636 to display completion of the handover. Thereafter, the UE may receive packet data through the target BS in operation 637. The packet data may be transferred to a second CN entity (for example, a serving gateway (S-GW) or a user plane function (UPF)). The target BS may make a path change 638 in a first CN entity (for example, MME, AMF, or the like) in order to inform that the UE changes the cell. The target BS may transmit a path switch request to the first CN entity. When receiving a UE context release message from the CN, the source BS performs UE context release 639.

In the AI-based handover procedure, learning for the neural network may be performed on the basis of learning data provided whenever the determination of the HO is performed. The UE may feed back HO result data to the current BS (for example, target BS) as the handover result. For example, the HO result data may be configured as follows.

Serving Cell ID: cell to receive feedback
# of data: number of pieces of learning data
Set of NN input list: set of NN input lists (corresponding to the number of # of data)
Set of NN output list: set of NN output lists (corresponding to the number of # of data)

The target BS may forward the corresponding data to the serving BS on the basis of the serving cell ID in the received feedback. The learning data may be cell-specifically configured. Accordingly, the corresponding cell (for example, serving cell) may complement the neural network structure of the cell through the corresponding learning data. By modifying the weights and the neural network structure, it is possible to acquire a neural network model more suitable for an individual situation of the UE or the BS.

When the BS receives a feedback request for HO training data in operation 620, the UE may transmit learning data to the BS after the training data end time that is a time point at which the learning data is requested. The UE directly transmits learning data to the serving BS when the handover is not performed, and transmits learning data through the current serving BS, that is, the target BS when the handover is performed. For example, when the UE is not connected with the BS or a mobile communication system, the UE may transmit learning data to the BS after the connection.

The target BS may learn weights of the neural network by using learning data transmitted from UEs in operation 641. The UE may learn by using all or some of the received learning data and a learning period may be determined by the BS. For example, the BS may perform learning whenever the UE returns learning information or according to a period of a predetermined time. Alternatively, the BS may perform learning as necessary. When the NN or the weight value is changed through learning, the BS may increase the NN index or the W index in order to distinguish between the previous neural network information and the current neural network information.

Figure 6B:
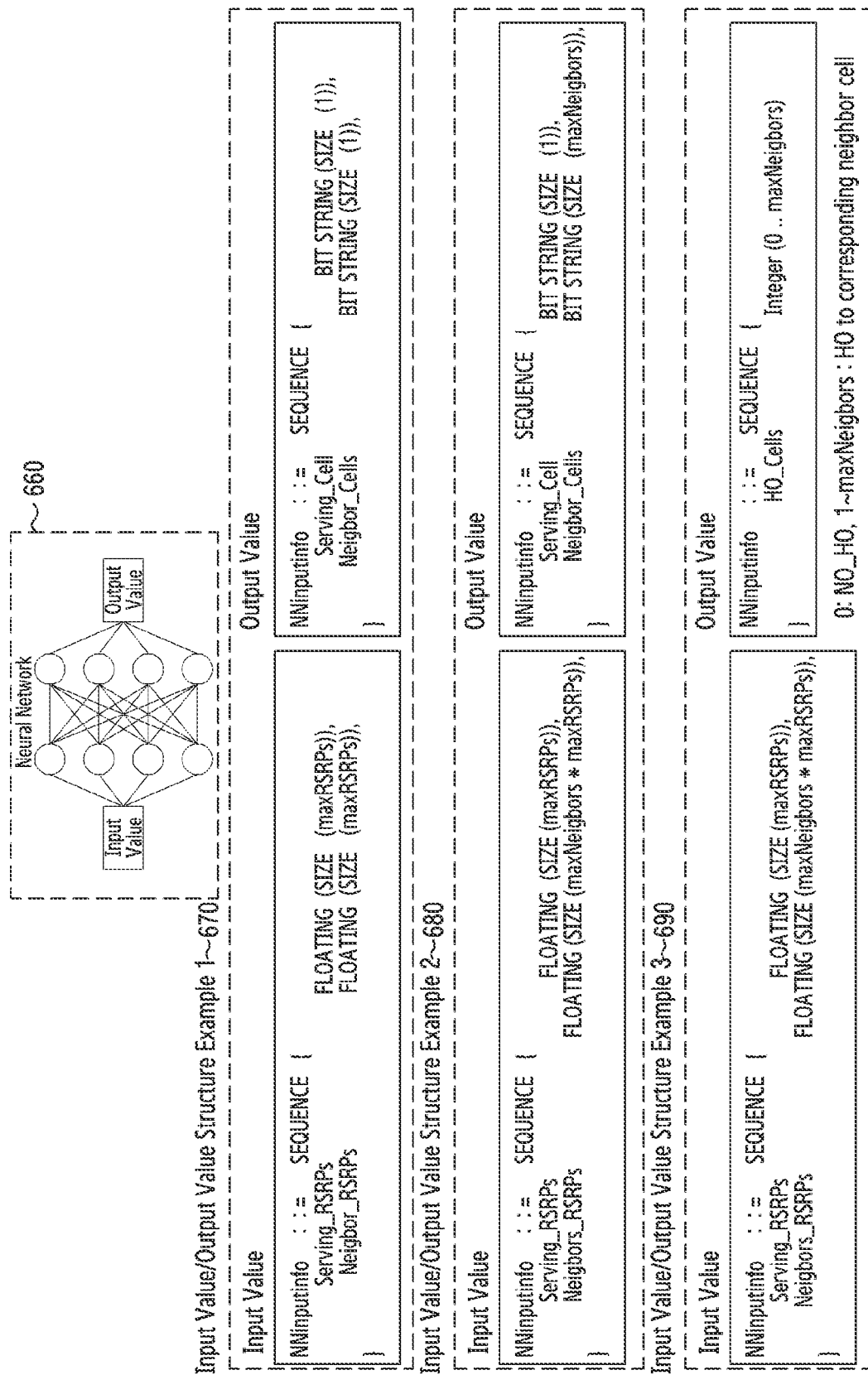
FIG. 6B illustrates an example of an input value and an output value of the AI-based handover according to various embodiments of the disclosure.

FIG. 6B illustrates an example of an input value and an output value of the AI-based handover according to various embodiments of the disclosure. An overall structure 660 of the neural network (NN) for the handover may be configured to output an output value through a downloaded hidden layer structure having an input value as an input. The neural network structure 660 corresponds to the neural network 400 of FIG. 4.

Referring to FIG. 6B, an input value to be transmitted to the neural network structure 660 and an output value to be provided through the neural network structure 660 may be configured in various ways. In some embodiments, information (hereinafter, referred to as input/output information) for the input value and the output value of the neural network structure may be configured by the BS. For example, the UE may acquire input/output information from the BS through radio resource control (RRC) signaling. For example, the BS may provide the input/output information to the UE along with signaling for configuring the AI-based handover. Further, for example, the UE may acquire the input/output information from the BS through a medium access control (MAC) control element (CE). For example, the BS may receive a MAC CE for activating a specific input/output set among a plurality of input/output sets from the UE. Further, for example, the UE may acquire the input/output information from the BS through DCI. According to a learning scheme, the input/output information may be dynamically indicated.

NN input info is input value information of the handover NN used for the handover. The input value may include at least one of various parameters. For example, the input value may be a radio signal intensity (RSRP, RSRP, or SINR). Further, for example, the input value may be throughput. The input value is not limited to the above-described parameters. Channel information (for example, CQI) which can be measured by the UE, that is, all radio signals (for example, CRS, CSI-RS, SS/PBCH block, and SRS) which can be measured by the UE may be considered as candidates of the input value. NN output info may be an output value format of the HO NN. The output value has the form of expressing its own BS and a neighboring BS to be handed over.

According to an embodiment, a first example 670 of the input/output information provides information indicating whether the handover is performed for the serving cell and each of the neighbor cells as the output value with RSRPs for one or more cells as the input value. maxRSRPs indicate a maximum value among the measured RSRPs. The input value may include the RSRP of the serving cell and the RSPR of one neighbor cell. The neighbor cell may be indicated to the UE through a neighbor cell list provided from the BS or identified according to a received signal intensity measured by the UE, or be a predetermined cell different from the serving cell. The output value may indicate whether the handover of the serving cell or the neighbor cell is performed through 1 bit. The output value may be formed by configuring a bit value of the cell which can be the target cell as '1' and a bit value of another cell (that is, the serving cell) as '0'.

According to an embodiment, a second example 680 of the input/output information provides information indicating whether the handover is performed for one or more cells as the output value with RSRPs for one or more cells as the input value. The input value may include the RSPR of the serving cell and RSRPs for one or more neighbor cells. The neighbor cell may be indicated to the UE through a neighbor cell list provided from the BS or identified according to a received signal intensity measured by the UE, or be a predetermined cell different from the serving cell. maxNeighbors indicates the maximum number of neighbor cells which can be measured. The output value may indicate whether the handover of each cell is performed through 1 bit. When the number of cells to be determined is N, the target cell may be indicated through a total of N bits. The output value may be formed by configuring a bit value of the cell which can be the target cell as '1' and a bit value for the remaining cells as '0'. Through a one hot encoding scheme, the output value may be fed back and provided to the BS as learning data for the neural network. At this time, in order to indicate whether the handover of each cell is performed according to a bitmap indicated by the output value, a cell-specific index may be defined.

According to an embodiment, a third example 690 of the input/output information provides information indicating whether the handover is performed for one or more cells as the output value with RSRPs for one or more cells as the input value The input value may be the same as that of the second example 680, but the output value may indicate a specific value rather than a bitmap form. For example, when it is determined whether the handover is performed for the serving cell and a total of 8 neighbor cells, the output value may indicate '0' when the handover is not performed. By indicating the serving cell through '0', non-performance of the handover may be indirectly indicated. Meanwhile, when the handover is performed to a fourth cell among the 8 neighbor cells, the target cell may be indicated by a total of 3 bits corresponding to '100'. At this time, in order to indicate the target cell according to the size indicated by the output value, a cell-specific index may be defined.

Although FIG. 6B illustrates an example of three pieces of input/output information, the disclosure is not limited thereto. That is, the description made with reference to FIG. 6B is only an example, and other types of input/output structures can be configured.

Figure 7:
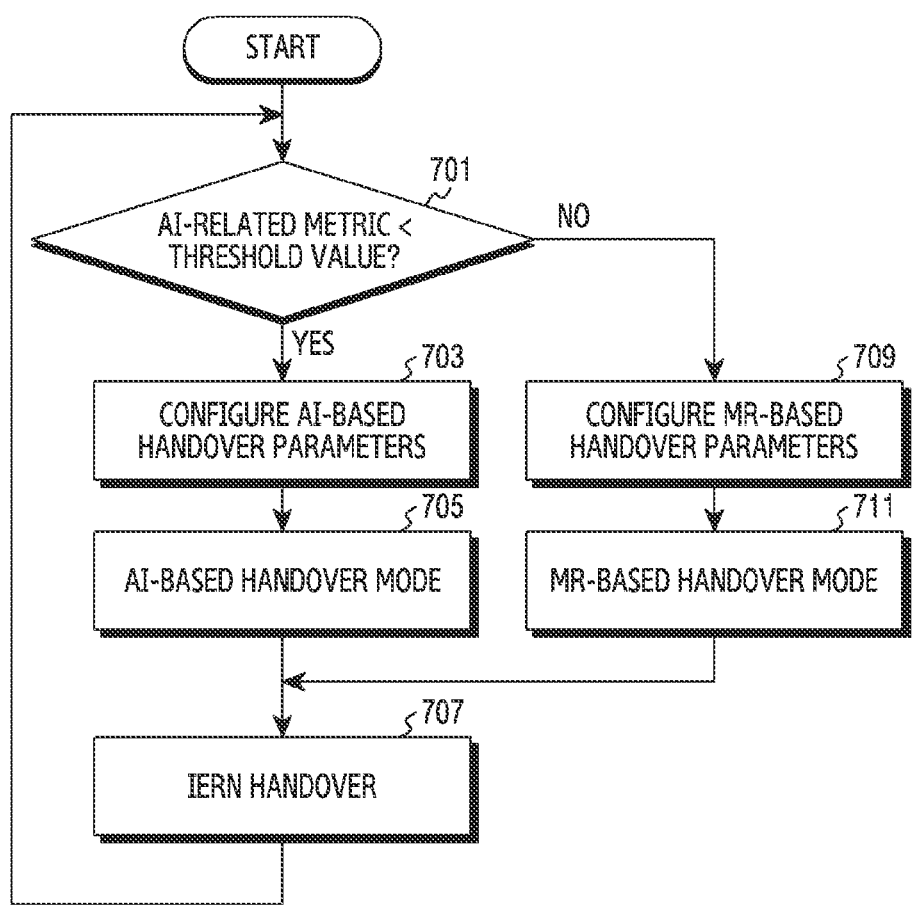
FIG. 7 illustrates the flow of an operation of the BS for an adaptive AI-based handover according to various embodiments of the disclosure.

FIG. 7 illustrates the flow of an operation of the BS for an adaptive AI-based handover according to various embodiments of the disclosure. The BS corresponds to the BS 110 of FIG. 1. FIG. 7 illustrates the flow of the operation of the BS for adaptively performing the AI-based handover through switching between the AI-based handover and the conventional handover scheme according to the current standard (for example, MR-based handover) according to various embodiments of the disclosure.

Referring to FIG. 7, in operation 701, the BS may determine whether AI-related metric is smaller than a threshold value. Through the determination procedure of operation 701, switching between the conventional handover (that is, MR-based handover) and a handover using a downloadable NN (that is, AI-based handover) may be adaptively performed.

AI-related metric may be defined in various methods. The AI-related metric is the scale indicating accuracy of the AI-based operation and may indicate how accurate output result is provided by the AI-based handover. In some embodiments, the AI-related metric may indicate an error of the AI-based handover. That is, it means that there is a larger error due to an output value provided through the AI-based handover as the AI-related metric is higher and there is a smaller error due to an output value provided through the AI-based handover as the AI-related metric is lower.

The BS may compare an AI-related metric value which is an error cost of the neural network (NN) with a threshold value (AIHOthreshold value). When the AI-related metric is smaller than the threshold value, the BS may perform operation 703. That is, when the NN cost value is larger than the AIHOthreshold value, it means that the error is small enough, and thus the BS may determine a handover type as AI phase. For example, when the previous handover type is the MR-based handover type, the BS may switch the handover type to the AI-based handover type. The BS may provide a relevant parameter to the UE to perform the AI-based handover using the NN.

Conventional HO (O/N)

AI HO (M)

Feedback Req (M/O/N)

In operation 703, the BS may configure AI-based handover parameters. The AI-based handover parameters may include structure information of the neural network for determining the handover and weight information of nodes in the neural network. The AI-based handover parameters may be parameters included in an AI algorithm for identifying whether the handover is performed and a target cell for the handover. According to an embodiment, operation 703 may be omitted when the handover-related parameters are preconfigured. This is because the UE can perform a procedure for the AI-based handover through a predefined value (default value) or a previously transmitted value. Alternatively, according to an embodiment, when the handover type is switched, that is, when the determination of operation 701 among the repetitive operations of FIG. 7 is different from the previous cycle, the BS may newly configure the corresponding types of parameters whenever the determination is different.

In operation 705, the BS may operate in the AI-based handover mode. For example, the BS may receive a handover request from the UE. The BS may perform a validation procedure for identifying whether the corresponding handover request is valid. When the handover request is valid, the BS may transit the handover request to the BS of the target cell, that is, a target BS and transmit a configuration message for the target BS to the UE.

Thereafter, the BS may perform handover learning in operation 707. That BS may perform learning by receiving learning data from the UE. Operation 701 may be performed, that is, the NN cost and the AIHOthreshold value may be compared on the basis of AI-related metric updated through learning.

Meanwhile, when the AI-related metric is not smaller than the threshold value in operation 701, the BS may perform operation 709. This is because, when there is no actual profit of the AI-based handover due to a large error in the AI-related metric, it is advantageous to perform the conventional handover type, that is, the MR-based handover type in the light of complexity. That is, when the NN cost is larger than the AIHOthreshold value, it means that the handover using AI is not sufficiently optimized, and thus it may be determined to perform the conventional handover procedure. For example, the BS may determine to switch to a learning phase 7-300. The BS may switch to the learning phase and provide the following relevant parameters to perform the conventional type of handover to the UE.

Conventional HO (M)
AI HO (N)
Feedback Req (M/O/N)

In operation 709, the BS may configure MR-based handover parameters. The MR-based handover is a handover performed through an MR which the UE reports to the BS and may be distinguished from the AI-based handover. The UE may perform measurement according to a measurement configuration provided by the BS and, when a predetermined condition (for example, A3 event of TS 36.331) is satisfied, transmit the measurement result to the BS. The BS may transmit the measurement configuration to the UE for the MR-based handover.

In operation 711, the BS may operate in the MR-based handover mode. For example, the BS may receive the measurement report from the UE. The BS may identify a neighbor cell having a better channel quality than the serving cell on the basis of the measurement report transmitted from the UE. The BS may determine whether to perform the handover on the basis of the measurement report. When the handover is performed, the BS may transmit a handover command to the UE. On the other hand, the BS may not perform the handover. Since the determination and the measurement are performed even though the BS does not actually perform the handover to the target cell, the BS may acquire learning data described below.

Thereafter, when receiving learning data transmitted from the UE and performing learning, the BS may perform operation 701 again. The BS may compare the NN cost with the AIHOthreshold value again. The AIHOthreshold value may be configured by the BS.

As described with reference to FIG. 7, the AI HO may be used in a situation in which AI operates well and the conventional HO may be used in other situations, and AI learning may be performed through feedback. That is, in the situation in which AI operates well, the BS may operate in the AI-based handover and, when an error increases, the feedback may be made in the conventional MR-based handover mode. According to an embodiment, in the AI-based handover mode, learning may be selectively configured. Further, the BS may transmit a message for indicating phase switching through the existence of nonexistence of the AI HO to the UE or may transmit a feedback request. The BS may perform a learning procedure therethrough.

Although FIG. 7 illustrates a determination procedure using the AI-related metric as the parameter for the error, embodiments of the disclosure are not limited thereto. When the AI-related metric is metric related to accuracy, the conditional equation of operation 701 of FIG. 7 may be modified. According to an embodiment, operations according to whether the AI-related metric is larger than a threshold value related to accuracy may be defined rather than determining whether the AI-related metric is smaller than the threshold value.

Further, although FIG. 7 illustrates that the BS determines whether to perform switching, various embodiments of the disclosure are not limited thereto. The UE may determine which type of handover is performed according to the AI-related metric. The UE may determine to switch the current handover type and transmit a message making a request for handover-related parameters to the BS according to the switching. For example, when the UE determines that the AI-based handover is needed, the UE may transmit a message making a request for parameters related to the AI-based handover to the BS. For example, a request message in FIG. 15A or 15B described below may be used.

Figure 8A:
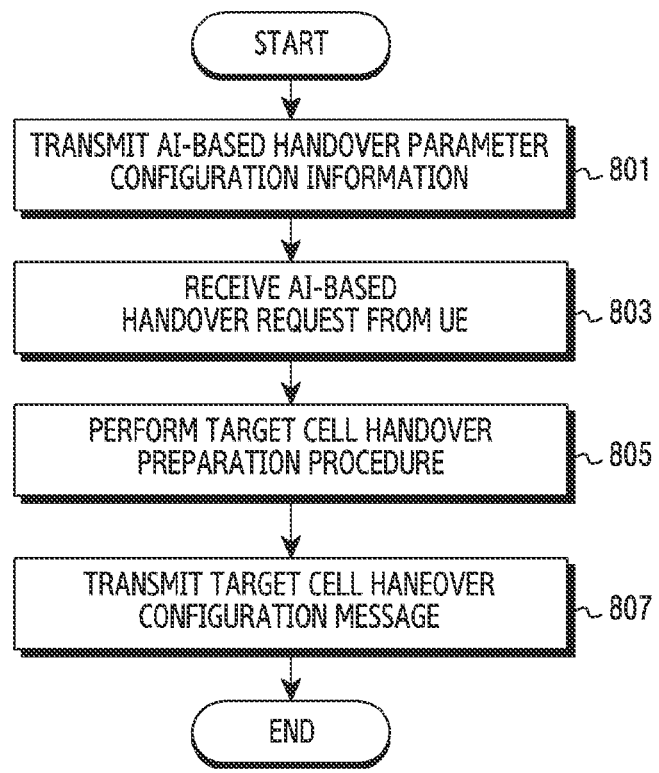
FIG. 8A illustrates the flow of an operation of the BS for performing the AI-based handover according to various embodiments of the disclosure.

FIG. 8A illustrates the flow of an operation of the BS for performing the AI-based handover according to various embodiments of the disclosure. The BS corresponds to the BS 110 of FIG. 1.

Referring to FIG. 8A, in operation 801, the BS may transmit configuration information of AI-based handover parameters.

The configuration information may provide various pieces of information. In some embodiments, the configuration information may indicate whether the AI-based handover is performed. The configuration information may include information indicating whether the AI-based handover is mandatory or optional, or information indicating whether to perform the MR-based handover that is the conventional handover type. Further, the configuration information may include a configuration related to whether learning data is fed back. For example, the configuration information may indicate whether a measurement result is fed back. Further, for example, the configuration information may include information related to a feedback format for the measurement result. Information collected according to the feedback format may be used by the BS to update a neural network structure described below.

In some embodiments, the structure information may include scheduling information related to transmission of the AI-based handover parameters. The scheduling information may include information on resources (for example, time-frequency resources) through which each of the AI-based handover parameters are transmitted and a period of the transmission.

In some embodiments, the structure information may include AI-based handover parameters. The AI-based handover parameters may be information for configuring a neural network related to determination to be performed for the handover. According to an embodiment, the AI-based handover parameters may include the neural network structure. The AI-based handover parameters may include information on the neural network structure, that is, a structure indicating the connection relation between nodes in hidden layers between the input layer and the output layer. Each node may indicate a determination related to the handover. Further, the AI-based handover parameters may include weight information. The weight information may indicate influence between nodes. For example, weight information from a first node to a second node may indicate a degree of influence of the determination of the first node on the determination of the second node. An influence degree may be expressed as a weight or a probability.

The BS may transmit the configuration information in various methods. In some embodiments, the BS broadcast the configuration information. According to an embodiment, the BS may broadcast the configuration information through system information. The AI-based handover parameters may be transmitted to the UE in the form of an information element (IE) within system information (for example, system information block (SIB)). For example, the neural network structure may be cell-specifically defined.

In some embodiments, the BS may multicast the configuration information. The BS may determine a multicasting group for AI learning. The BS may transmit configuration information of the AI-based parameters to the UE within the group. At this time, the neural network structure may be group-specifically defined. For example, the multicasting group may include UEs located in the same geographical area. Further, for example, the multicasting group may be UEs having the same mobility (for example, UEs located within the same means of transportation).

In some embodiments, the BS may unicast the configuration information. The BS may transmit the configuration information of the AI-based parameters to the UE by through scheduled downlink transmission. At this time, the configuration information may be cell-specific, group-specific, or UE-specific. The BS may transmit the configuration information of the AI-based handover parameters through RRC, MAC CE, or DCI.

Although various schemes in which the BS transmits the configuration information are described, a plurality of transmission schemes may be combined. That is, the AI-based parameters may be transmitted to the UE in such a manner that some of the AI-based parameters are broadcasted and other AI-based parameters are unicasted According to an embodiment, the BS may broadcast information indicating whether the AI-based handover is activated. Further, the BS may unicast information on the neural network configured for the AI-based handover. The information on the neural network structure may be transmitted through RRC, information on the weights may be dynamically indicated through a MAC CE or DCI in universal set configured by RRC.

Further, according to an embodiment, the BS may unicast the universal set of the neural network structure for the AI-based handover and universal set of weight information through RRC. In addition, the BS may unicast specific structure information (NN) or specific weight information (W) in universal set. At this time, the specific structure information may be transmitted through RRC, MAC CE, or DCI. The weight information may be transmitted through RRC, MAC CE, or DCI.

According to an embodiment, the BS may broadcast neural network-related information for the AI-based handover. The BS may broadcast the structure information for the neural network and the weight information.

According to an embodiment, the BS may broadcast the structure information of the neural network for the AI-based handover and unicast the weight information of the neural network for the AI-based handover. The BS may configure nodes in the neural network structure through the result considering an individual environment of the BS (for example, buildings located around the BS, a height of the installed BS, information on neighbor BSs, distances from neighbor BSs, interference for neighbor BSs, the existence or nonexistence of long-distance interference, and the like). The BS may generate an operation area (for example, the operation area 420 of the neural network 400 in FIG. 4) corresponding to the hidden layer between the input layer and the output layer through the configured nodes. The structure information may be cell-specifically configured. A measurement value, a distance from each cell, or a channel quality with each cell is frequently changed according to a movement condition of the UE, and the weight information transmitted to the UE may be UE-specifically configured. The weight information may be transmitted through RRC, MAC CE, or DCI.

In operation 803, the BS may receive an AI-based handover request from the UE. The BS may determine whether to perform the handover through the handover request. The handover request may include information for determining whether to perform the handover.

According to an embodiment, the handover request may include information on the target cell (for example, a target cell ID). The target cell may be a cell identified by the UE on the basis of the neural network structure (NN) and the weights (W) in operation 801. The UE may configure the measurement result for the cell as an input value and acquire an output value for the target cell on the basis of the neural network structure and the weights.

Further, according to an embodiment, the handover request may include neural network information used for identifying the target cell. For example, the handover request may include an index for the NN used for identifying the target cell. Further, for example, the handover request may include an index for a weight set used for identifying the target cell. This is because validation of the corresponding handover request can be verified according to which neural network is used to select the target cell. The BS may perform a procedure of validating the handover request to the target cell on the basis of the neural network information.

Further, according to an embodiment, the handover request may include information on an input value(s)(hereinafter, input information) used for identifying the target cell. The BS may be required to acquire input information in order to verify whether the handover request is valid. This is because, when the input value acquired in the predetermined neural network structure is applied, the same result as the target cell to which the UE makes a request for the handover should be derived. The BS may perform a procedure of validating the handover request to the target cell on the basis of the input information.

The handover request may include at least one of the target cell information, the neural network information, and the input information. That is, not all the information is included in the handover request, and transmission of some pieces of the information may be omitted according to some embodiments.

In operation 805, the BS may perform a target cell handover preparation procedure. The BS may transmit a handover request to the BS of the target cell, that is, a target BS. The BS may be a serving BS of the current UE and also a source BS. The BS may receive acknowledgement of the handover from the target BS.

In operation 807, the BS may transmit a target cell handover configuration message to the UE. The configuration message may be a message for configuring access to the target BS. For example, the configuration message may include an RRCConectionReconfiguration message. The configuration message may include mobility-related information. The UE may perform access to the target BS on the basis of the configuration message.

Although not illustrated in FIG. 8A, the BS may transmit data stored in the buffer to the target BS while the handover is performed. It is possible to guarantee continuity of communication to the UE through transmission of the data stored in the buffer.

Figure 8B:
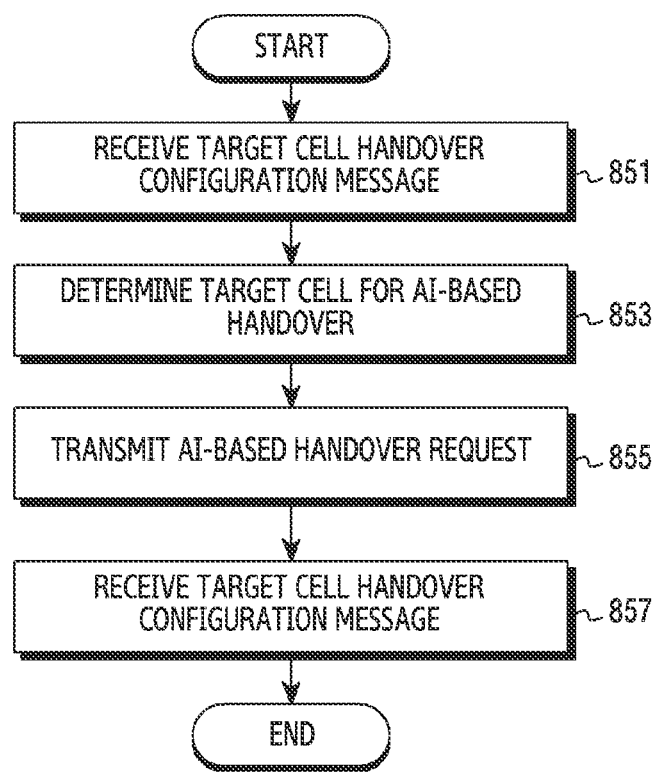
FIG. 8B illustrates the flow of an operation of the BS for performing the AI-based handover according to various embodiments of the disclosure.

FIG. 8B illustrates the flow of an operation of the UE for performing the AI-based handover according to various embodiments of the disclosure. The UE corresponds to the UE 120 in FIG. 1.

Referring to FIG. 8B, in operation 851, the UE may receive configuration information of AI-based handover parameters. The description for the configuration information in operation 801 of FIG. 8A may be equally applied to the configuration information of the AI-based handover parameters.

When information indicating whether to perform the AI-based handover is indicated, the UE may monitor parameters for performing the AI-based handover. Further, when the UE is configured to feed back AI-based learning data, the UE may measure transmitted signals (for example, SS/PBCH block of the BS, CRS, CSI-RS, and the like) and store the measurement result.

The UE may receive scheduling information. The UE may acquire structure information and weight information in order to acquire a neural network model for the AI-based handover on the basis of the scheduling information. That is, the UE may receive the structure information for the neural network. The UE may receive the weight information on the neural network. In some embodiments, the structure information and the weight information may be transmitted through one message. The UE may transmit the structure information and the weight information together. At this time, the weight information may be dependent on the structure information. That is, the weight information transmitted in one message may include a weight value applied to the neural network structure of the structure information included in the same message. In other embodiments, the structure information and the weight information may be independently acquired. According to an embodiment, a transmission period of the structure information may be configured to be longer than a transmission period of the weight information. For example, when the transmission period of the weight information is T, the transmission period of the structure information may be 5T. At this time, the UE may determine whether the handover is performed by applying different pieces of weight information in every T in the same neural network structure for 5T intervals. It is possible to select the optimized target cell by more frequently controlling weight influence due to the UE.

The UE may acquire a neural network model provided by the BS from the configuration information of the AI-based handover parameters. For the AI-based handover, the neural network model may include information on a probability between a logical structure and a determination for an AI algorithm for selecting the target cell.

In operation 853, the UE may determine the target cell for the AI-based handover. The UE may acquire input values to be input into the acquired neural network model in operation 851. The UE may periodically or aperiodically measure a channel quality. For example, the input values may be result values measured by the UE. For example, the input values may include at least one of RSRP, RSRP, CQI, and SINR.

The UE may acquire a final output value by applying the input values to the neural network model. In some embodiments, the acquired output value may include cell information. When the cell is a serving cell, the UE may not perform the handover. When the cell is a neighbor cell, the UE may transmit a handover request message to perform the handover to the corresponding neighbor cell. Further, in some embodiments, the acquired output value may indicate whether the handover is performed. The BS may determine whether the handover request message is transmitted according to whether the handover is performed. When the handover is performed according to the final output value, the UE may identify the target cell. The target cell may be a cell identified through the input values measured by the UE and the neural network model provided by the BS.

In operation 855, the UE may transmit an AI-based handover request. The UE may generate an AI-based handover request message. The AI-based handover request message may include information on the target cell. Through provision of the information on the target cell to the serving cell, the serving BS may perform a handover preparation procedure. Further, in order to determine whether the handover to the target cell is valid, the BS may be required to recognize the information on the target cell.

The AI-based handover request message may include an index (for example, NNindex) of the neural network structure of the neural network model used for identifying the target cell for the AI-based handover. In order to determine whether the handover to the target cell is valid, the BS may be required to recognize the used neural network structure.

The AI-based handover request message may include an index (for example, W index) of the weight set applied to the structure of the neural network model used for identifying the target cell for the AI-based handover. In order to determine whether the handover to the target cell is valid, the BS may be required to recognize the used weight set.

In operation 857, the UE may receive a target cell handover configuration message. The UE may receive the target cell handover configuration message from the serving BS. The target cell handover configuration message may be associated with a BS to which the BS transitions from the serving BS. The target cell handover configuration message may include RRC reconfiguration information of the target BS.

Through FIGS. 4 to 8B, the AI-based handover and conventional handover schemes have been described. Unlike the conventional MR-based handover, the BS and the UE have advantages of selecting a cell more suitable for an individual situation through a design of the neural network and a configuration of the UE to select a target cell according thereto. The BS performs learning according to a cell state/environment and transmits the neural network structure and weight information which are the performance result to the UE, so that the UE may perform the handover to a target cell more suitable for an actual situation.

The BS may receive feedback of data acquired during the actual handover from the UE performing the handover and additionally perform learning rather than performing only one handover. The BS may update the neural network mode according to additional learning. The BS may newly configure the neural network structure or newly configure weight values between modes within the structure. The UE may identify a target cell suitable for a cell state/environment according to a predetermined input value through transmission of the neural network structure (NN) learned in the cell state/environment. Such learning is performed not only for the AI-based handover but also for the conventional MR-based handover, and thus an effect due to the AI-based handover can be maximized.

Meanwhile, when enough data for configuring the neural network is not accumulated or an environment around the BS is changed, accuracy may rather become lower due to the AI-based handover. Accordingly, the BS may determine whether to operate in the AI-based handover mode by comparing the AI-related metric with the threshold value. The BS may operate in the AI-based handover mode in a situation in which AI operates well and may operate in the conventional handover mode in other situations. Even through the BS operates in the conventional handover mode, measurement information collected by the UE may be used as learning data for the neural network model provided in the operation of the AI-based handover in the future. Accordingly, the BS may learn the neural network structure to select the target cell through feedback received from the UE in spite of the MR-based handover which is the conventional handover mode.

The UE may predict a state/environment of the UE through a change in the channel quality (for example, a change in the RSRP/SNIR) which is an input value and the change in the input value may influence the determination of the handover by the UE. Even though the UE does not transmit a report to the BS, the UE performs measurement, and thus the UE may use a larger amount of data. For example, since a signal measurement period of the UE is shorter than a measurement report period, the UE may collect a larger amount of measurement data than the BS. Accordingly, the UE directly determines whether the handover is performed rather than waiting for the determination of the BS through transmission of the measurement report, thereby reducing an accurate effect generated due to a delay after the measurement report. Further, it is possible to identify a target cell suitable for the actual UE situation by selecting the target cell in real time on the basis of the measured channel quality.

A procedure of finding a cell to be accessed according to movement of the UE needs to be stably designed to construct an access network environment of the UE. For example, in exceptional circumstances such as the case in which the parameters for the AI-based handover are not configured, the AI-based handover parameters are not acquired (for example, decoding failure or loss), or the determination of the target cell is not valid, the AI-based handover may need predefinition of operations between the BS and the UE may be needed for robust design of the network. Hereinafter, in FIGS. 9 to 13, operations between the BS and the UE in a specific situation are described to perform the AI-based handover.

Broadcast Information for Configuring AI-Based Handover

Figure 9:
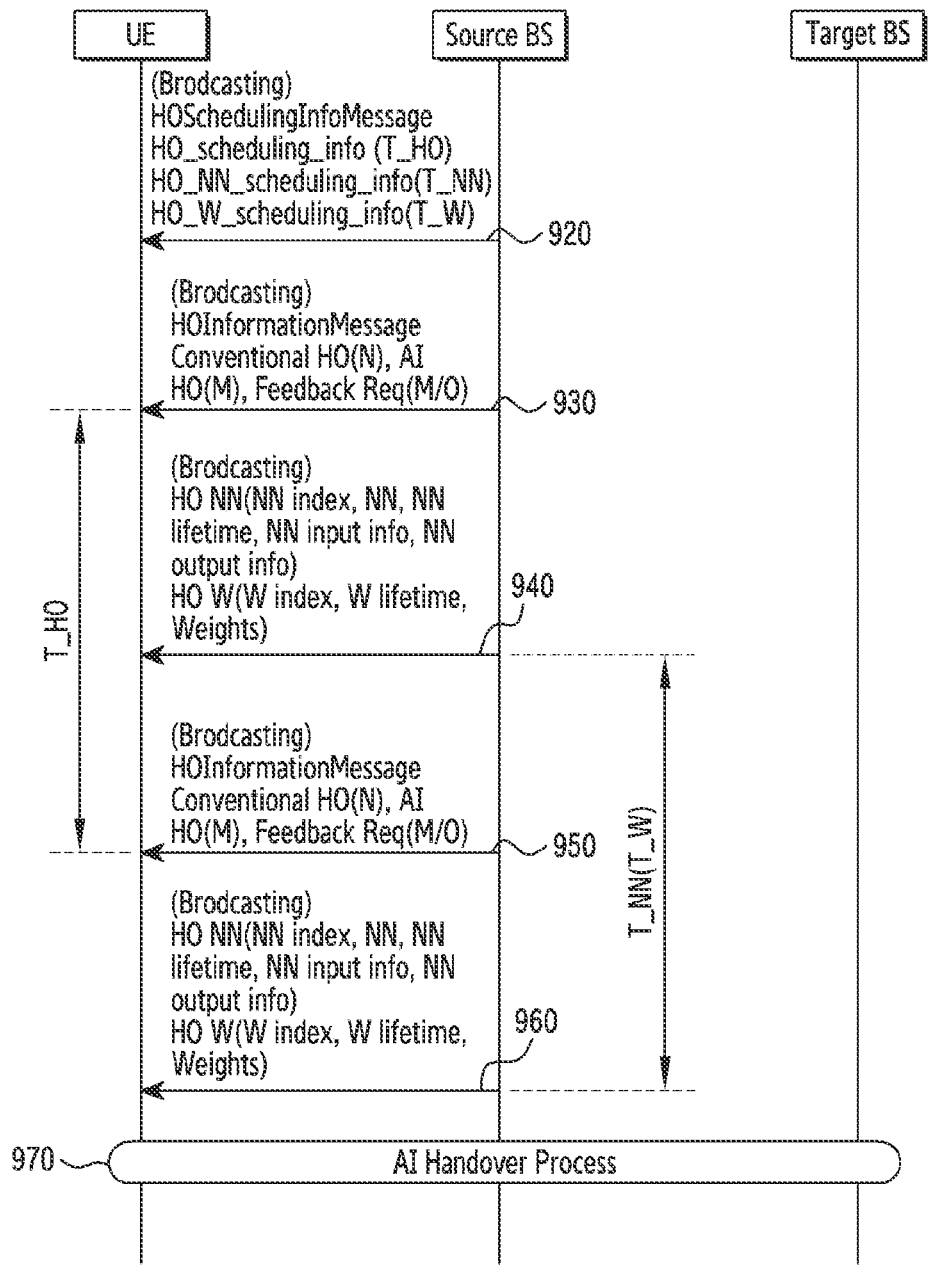
FIG. 9 illustrates the flow of signals for the AI-based handover according to various embodiments of the disclosure.

FIG. 9 illustrates the flow of signals for the AI-based handover according to various embodiments of the disclosure. In FIG. 9, a situation in which all pieces of information related to the AI-based handover are broadcasted is described. That is, the neural network structure (NN) and weight information used for the AI-based handover are broadcasted. Hereinafter, FIG. 9 illustrates a situation in which each piece of information is broadcasted but the same application may be made to a multicasting scheme.

Referring to FIG. 9, in operation 920, the BS may broadcast scheduling information. The BS may be a serving BS of the current UE and also a source BS. The BS may use system information in order to broadcast the scheduling information. According to an embodiment, the BS may transmit HO-related scheduling information through HOSchedulingInfoMessage in a method of transmitting system information (for example, SystemInformationBlock (SIB) or the like) of the BS. At this time, the message HOSchedulingInfoMessage including the scheduling information may include one or more pieces of the following information.

HO_scheduling_info (T_HO): time point or period at which the BS transmits HOInformationMessage HO_NN_scheduling_info (T_NN): time point or period at which the BS transmits structure information (HO NN) for the neural network of the AI-based handover HO_W_scheduling_info (T_W): time point or period at which the BS transmits weight information (HO W (Weights)) for the neural network of the AI-based handover In other words, the scheduling information (HO_scheduling_info) may contain information for scheduling of indication information (for example, HOInformationMessage) indicating a handover type and information related to the neural network of the AI-based handover (for example, HO NN and HO W (weights)). According to an embodiment, the scheduling information may additionally include an offset to indicate a specific time point as well as the period. The offset may indicate an accurate transmission time point along with period information. Meanwhile, according to another embodiment, only the period information may be transmitted and a fixed value may be used as the offset.

In operation 930, the BS may broadcast handover indication information. The BS may periodically broadcast handover indication information. Thereafter, the BS may broadcast handover indication information in operation 950. The period on which the indication information is broadcasted is 'T_HO' and may be broadcasted through scheduling information. The indication information (HOInformationMessage) may include various pieces of information. For example, the indication information may include at least one piece of information indicating whether the convention HO is performed, whether the AI HO is performed, and whether a feedback Req is made (feedback format). In an example of the operation of transmitting HOInformationMessage, HOInformationMessage may be periodically transmitted.

After receiving HOInformationMessage transmitted in operation 930, the UE may identify a time point at which neural network-related information for the AI-based handover is transmitted from HO_NN_scheduling_info (T_NN) and HO_W_scheduling_info (T_W). After identifying the time point at which the neural network-related information is transmitted, the UE may receive the neural network-related information in operation 940. The neural network-related information may include structure information and weight information for the neural network model for the AI-based handover. Although FIG. 9 illustrates that the neural network information and the weight information are transmitted according to the same period, this is only an embodiment and various embodiments of the disclosure are not limited thereto. The transmission periods of the neural network information and the weight information may be independently configured. That is, T_NN and T_WW may have different values or may have an interval between transmission time points even though they have the same value.

The UE receives information indicating the performance of the AI-based handover in operation 930 and receives parameters related to the AI-based handover in operation 940, thereby acquiring the neural network model for performing the AI-based handover. That is, the UE may receive information required for the AI HO in the BS by receiving the structure information (HO NN) and the weight information (HO W information) in operation 930 and operation 940.

The structure information according to various embodiments may include at least one of the following parameters.

NN index: NN index used for the HO (the index increases when the NN is updated)
NN: NN used for the HO
NN lifetime: lifetime of the corresponding NN
NN input info: input value of the NN (for example, radio signal intensity list)
NN output info: output value of the NN (for example, the existence or nonexistence of the HO (one-hot encoding) or a cell ID) Ex1, {HO, not HO}, Ex2, {Serving cell, Neighbor cell1(Cell ID), Neighbor cell2, . . . }

The structure information according to various embodiments may include at least one of the following parameters.

W index: weight index used for the HO (the index increases when the weight is updated)

W lifetime: lifetime of the corresponding weight

Weights: weight value used for the HO NN

The structure information and the weight information may be transmitted simultaneously or separately. The corresponding information may be periodically transmitted. In an example of the operation of transmitting the HO NN and HO W information, the HO NN and the HO W information may be periodically transmitted, or the structure information and the weight information may be transmitted again in operation 960 after the structure information and the weight information are transmitted in operation 940.

When the UE receives the structure information and the weight information for the neural network of the AI-based handover, the AI-based handover may be performed in a method configured by the BS. Accordingly, in operation 970, the BS and the UE may perform the AI-based handover process. Such an operation is a procedure in which the UE accesses the target BS as well as the BS and corresponds to a procedure after operation 623 of FIG. 6A, that is, the determination of the target cell.

In the case of periodic broadcasting, even though some parameters for performing the AI-based handover are not acquired, required information may be acquired through standby until the next period. It is possible to achieve an efficient handover by applying the AI-based handover determination method to the wireless communication system between the BS and the UE through a combination of cell information and measurement information or environment information of the UE.

Case in which Configuration Information of AI-Based Handover is not Acquired

Figure 10:
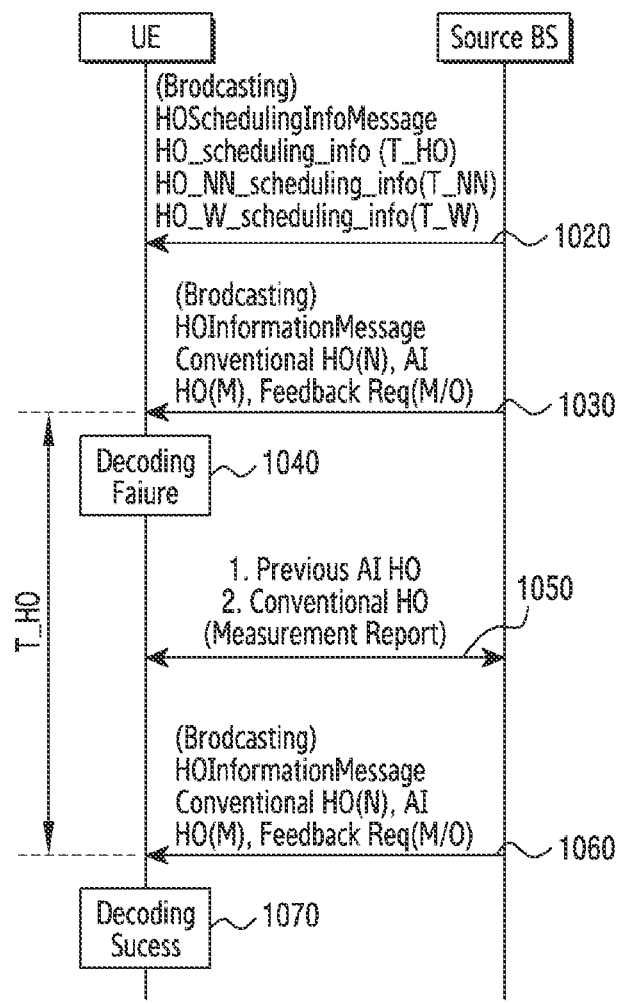
FIG. 10 illustrates an example of operations of the BS and the UE when information indicating whether the AI-based handover is used is not received according to various embodiments of the disclosure.

FIG. 10 illustrates an example of operations of the BS and the UE when information indicating whether the AI-based handover is used is not received according to various embodiments of the disclosure. In FIG. 10, a situation in which broadcasted (or multicasted) indication information (information indicating whether the AI HO is used) is not received (for example, decoding failure) in the AI-based handover is described.

Referring to FIG. 10, in operation 1020, the BS may broadcast scheduling information (HOSchedulingInfoMessage). The BS may be a serving BS of the current UE and also a source BS. The UE may determine a transmission time point of the indication information (HOInformationMessage) on the basis of the received scheduling information.

In operation 1030, the BS may transmit the indication information HOInformationMessage). The UE may attempt reception of the indication information HOInformationMessage).

When the indication information HOInformationMessage) is not normally received or when an error occurs in spite of reception, the UE may detect the occurrence of decoding failure of the corresponding message in operation 1040. The UE may operate according to operation 1050 before receiving the following indication information.

When there are an NN and a weight of which lifetimes are left among the NNs and the weights received by the conventional BS, the corresponding NN and weight are used.

When there are an NN and a weight of which lifetimes have expired among the NNs and the weights received by the conventional BS, the corresponding NN and weight are used.

A default parameter of the conventional HO operates. An MR-based handover mode operates.

The AI HO process is performed after it is identified whether the AI HO is used when indication information (HOInformationMessage) transmitted according to the T_HO period is received.

According to an embodiment, the UE may operate according to the priority of 1), 2), and 3). That is, when the structure information of the neural network and the weight information received from the conventional BS do not exist, the MR-based handover mode of 3) may operate. At this time, the operation of 4) may be prioritized than 1), 2}, and 3). Meanwhile, according to an embodiment, 3) may be performed when the structure information and the weight information do not exist right after determination of 2) rather than determining all of 1), 2), and 3). Alternatively, according to another embodiment, 3) may be performed when the structure information and the weight information do not exist right after determination of 1). Alternatively, according to another embodiment, when the structure information and the weight information do not exist right after determination of 1) and 2), the UE may monitor indication information broadcasted in the next period without any additional operation or may re-access the cell.

Thereafter, in operation 1060, the UE may re-receive the message including indication information (HOInformationMessage) transmitted according to the period of T_HO. When normally receiving the corresponding message, the UE operates as the operation configured in the indication information (HOInformationMessage) in operation 1070.

Meanwhile, although FIG. 10 illustrates the operation of the UE according to whether the indication information indicating whether the AI-based handover is performed is normally received, the same type of procedure may be used when scheduling information is not normally received. For example, when scheduling information for the weight information and the structure information is not acquired, the UE may operate according to at least one of 1), 2), 3), and 4) below.

1) When there is an NN of which a lifetime is left among NNs received in the conventional cell, the corresponding NN is used.

2) When there is an NN of which a lifetime has expired among NNs received in the conventional cell, the corresponding NN is used.

3) A default parameter of the conventional HO operates.

4) The AI HO process is performed after it is identified whether the AI HO is used when indication information (HOInformationMessage) transmitted according to the T_HO period is received.

Figure 11:
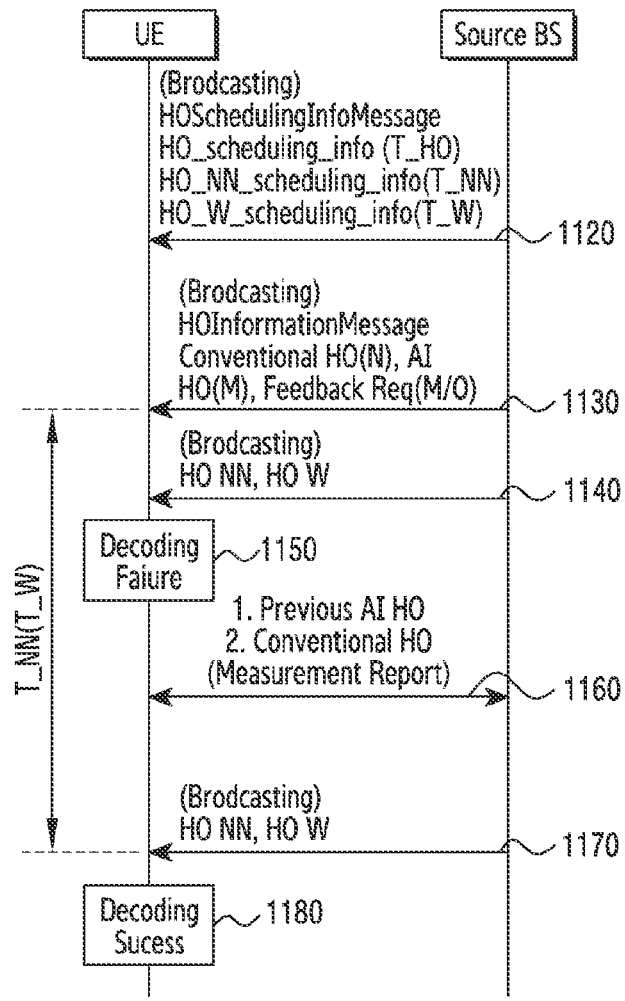
FIG. 11 illustrates an example of operations of the BS and the UE when neural network-related information of the AI-based handover is not received according to various embodiments of the disclosure.

FIG. 11 illustrates an example of operations of the BS and the UE when neural network-related information of the AI-based handover is not received according to various embodiments of the disclosure. The neural network-related information may include structure information indicating the relation between nodes included in the neural network and weight information indicating a degree of influence between nodes. Hereinafter, operations of the BS and the UE in the state in which the UE does not acquire the structure information and the weight information are described.

Referring to FIG. 11, in operation 1120, the BS may broadcast scheduling information. The BS may be a serving BS of the current UE and also a source BS. On the basis of information transmitted through the scheduling information (HOSchedulingInfoMessage), the UE may determine a transmission time point of the indication information (HOInformationMessage) and receive the indication information (HOInformationMessage) in operation 1130. The indication information may indicate whether the AI-based handover is used (for example, mandatory (M), optional (O), or none (N)). When the indication information (HOInformationMessage) indicates the use of the AI-based handover (for example, M or O), the UE is required to acquire structure information and weight information for the neural network in order to acquire a neural network model of the AI-based handover of the BS.

In operation 1140, the BS may transmit the structure information and the weight information to the UE. However, when the UE does not receive the weight information or the structure information in operation 1150, the UE may perform an operation that is the same as the next sequence (operation 1160) before the corresponding information is received.

1) When there are an NN and a weight of which lifetimes are left among the NNs and the weights received by the conventional BS, the corresponding NN and weight are used.

2) When there are an NN and a weight of which lifetimes have expired among the NNs and the weights received by the conventional BS, the corresponding NN and weight are used.

3) A default parameter of the conventional HO operates.

Thereafter, the BS may transmit the structure information according to a period of T_NN and transmit the weight information according to a period of T_W in operation 1170. The UE may receive the structure information and the weight information.

When the UE normally acquires the structure information and the weight information through decoding success in operation 1180, the UE may acquire a neural network model for the AI-based handover in the BS. The UE may operate in the AI-based handover mode.

Although FIG. 11 illustrates that the weight information and the structure information are transmitted together, the weight information and the structure information may be transmitted according to independent periods. In this case, the operation of the UE in the case in which decoding fails may be defined independently for the structure information and the weight information.

For example, when the weight information (W) is effectively acquired but the structure information (NN) is not effectively acquired, the UE may operate as follows.

1) When there is an NN of which a lifetime is left among NNs received in the conventional cell, the corresponding NN is used.

2) When there is an NN of which a lifetime has expired among NNs received in the conventional cell, the corresponding NN is used.

3) A default parameter of the conventional HO operates.

4) When an NN transmitted according to a period of T_NN (T_W) is received, the AI HO process is performed.

Case for Validation Failure of Target Cell

Figure 12:
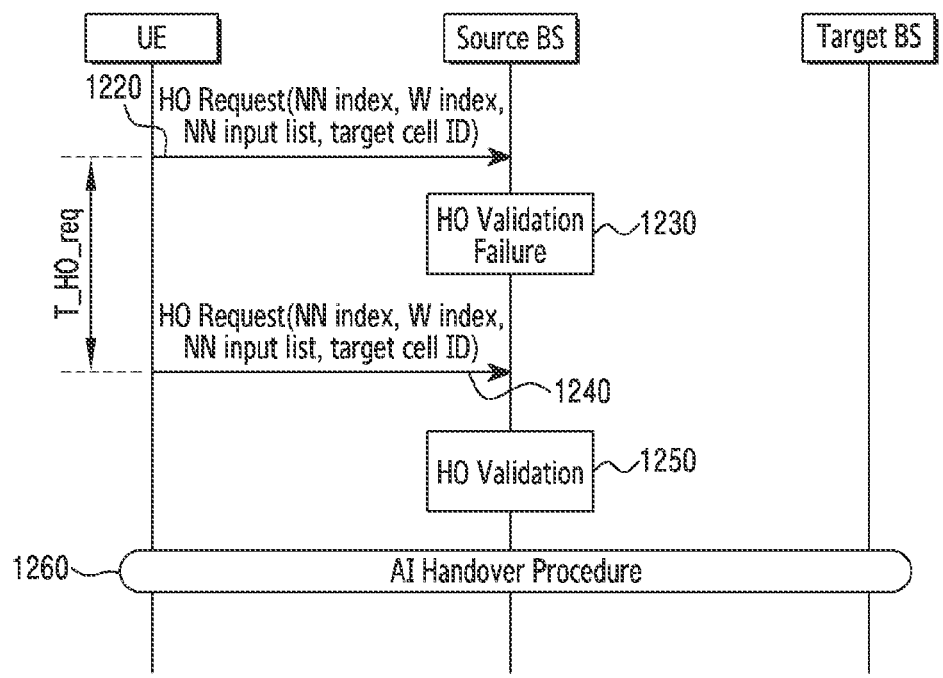
FIG. 12 illustrates an example of operations of the BS and the UE when validation for a handover request from the UE fails in the AI-based handover according to various embodiments of the disclosure.

FIG. 12 illustrates an example of operations of the BS and the UE when validation for a handover request from the UE fails in the AI-based handover according to various embodiments of the disclosure. In the AI-based handover mode, the UE may identify a target cell on the basis of an input value and a neural network model of the BS. The UE may transmit a handover request including information on the target cell to a serving BS. The serving BS may verify whether the indicated target cell is a cell according to the neural network model of the BS, and FIG. 12 illustrates an example in which no separate indication is transmitted to the UE in the state where validation has failed.

Referring to FIG. 12, in operation 1220, the UE may transmit the handover request to the serving BS. The handover request may be transmitted when an AI-based handover condition is satisfied. In order to determine whether the UE correctly identifies the target cell according to the neural network model for the AI-based handover of the BS, the handover request may include information for validation. For example, the handover request may include at least one of neural network structure information (NN index), input information (NN input list), target cell information (target cell ID), and neural network weight information (W index).

In operation 1230, the UE may identify the structure information (NN) and the weight information (W) which the BS transmits through the neural network structure (NN) and the weights (weight index) used by the UE in the handover request (HO request). The BS may reconfigure the neural network model for the AI-based handover on the basis of the neural network-related information (NN/Weights) received from the UE. After the reconfiguration, the BS may apply the input information (NN Input) used by the UE to the reconfigured neural network model as the input, so as to acquire the output. The BS may determine whether the output is a target cell ID included in the handover request.

When the cell ID of the output of the reconfigured neural network mode is different from the target cell ID included in the handover request, the BS identifies HO validation failure and does not transmit a handover command to the UE. Meanwhile, even when the cell ID of the output of the reconfigured neural network model is the same as the target cell ID included in the handover request, the BS may determine whether to perform the handover (HO) in response to the received handover request according to a condition of the BS, a condition of the network (for example, load balancing, UE QoS, and the like), and selection of the BS.

In the above case, the handover command has not been transmitted, and thus the UE may transmit again the handover (HO) request after T_HO_req which is a handover request period in operation 1240. Alternatively, unlike in FIG. 12, the UE may transmit again the handover request (HO request) after various time delay methods such as random backoff and the like. In operation 1250, the serving BS may perform a validation procedure of the AI-based handover (HO validation) through a method that is the same as operation 1230. Thereafter, when validation is successful, the serving BS, the target BS, and the UE may perform a normal handover procedure in operation 1260. For example, the handover procedure may mean a procedure after operation 625 of FIG. 6 (HO validation).

Figure 13:
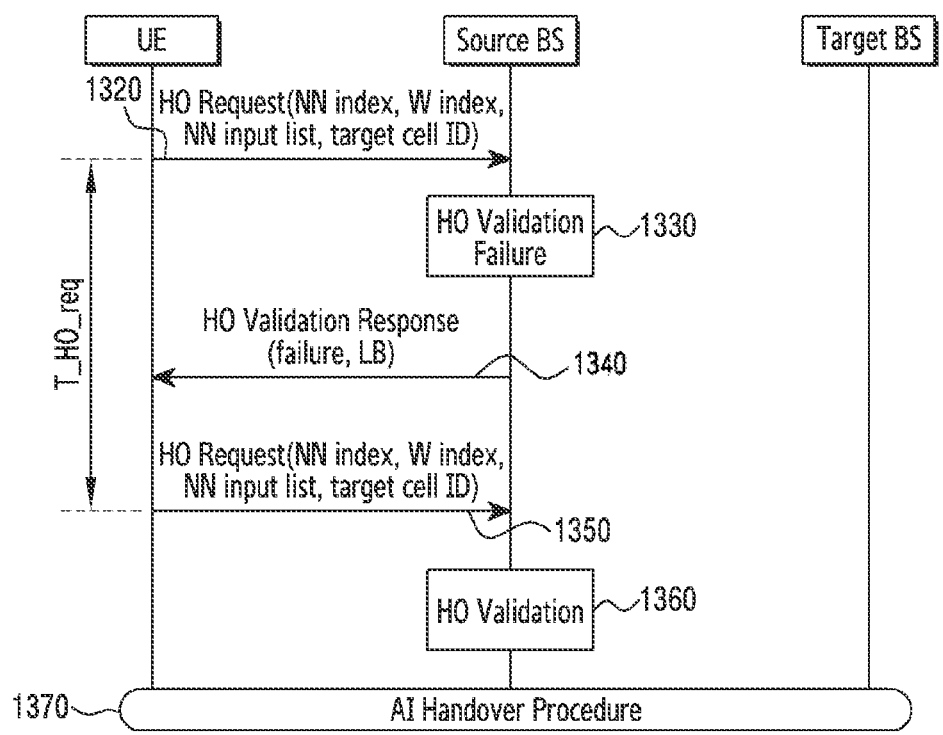
FIG. 13 illustrates another example of the operations of the BS and the UE when validation for a handover request from the UE fails in the AI-based handover according to various embodiments of the disclosure.

FIG. 13 illustrates another example of operations of the BS and the UE when validation for the handover request from the UE has failed in the AI-based handover according to various embodiments of the disclosure. Like in FIG. 12, the serving BS may perform the validation procedure in order to determine whether handover to the target cell is valid in response to the handover request of the UE. Unlike FIG. 12, FIG. 13 illustrates an embodiment in which a separate indication for validation failure is transmitted to the UE in the state in which validation has failed.

Referring to FIG. 13, in operation 1320, the UE may transmit the handover request to the serving BS. The handover request may be transmitted when an AI-based handover condition is satisfied. In order to determine whether the UE correctly identifies the target cell according to the neural network model for the AI-based handover of the BS, the handover request may include information for validation. For example, the handover request may include at least one of neural network structure information (NN index), input information (NN input list), target cell information (target cell ID), and neural network weight information (W index).

In operation 1330, the UE may identify the structure information (NN) and the weight information (W) which the BS transmits through the neural network structure (NN) and the weights (weight index) used by the UE in the handover request (HO request). The BS may reconfigure the neural network mode for the AI-based handover on the basis of the neural network-related information (NN/Weights) received from the UE. After the reconfiguration, the BS may apply the input information (NN Input) used by the UE to the reconfigured neural network model as the input, so as to acquire the output. The BS may determine whether the output is a target cell ID included in the handover request.

When the cell ID of the output of the reconfigured neural network model is different from the target cell ID included in the HO request, the BS identifies HO validation failure and does not transmit a handover command to the UE. Meanwhile, even when the cell ID of the output of the reconfigured neural network mode is the same as the target cell ID included in the handover request, the BS may determine whether to perform the HO in response to the received handover request according to a condition of the BS, a condition of the network (for example, load balancing, UE QoS, and the like), and selection of the BS.

In operation 1340, the BS may transmit a response to the handover request (HO validation response) to the UE. The response may indicate that the handover request is not accepted. According to an embodiment, the response may further include information settings of bits indicating that the handover request is not accepted and information on the reason of a cause. The BS configures a bit value for the reason why the handover request is not accepted and transmits the configured bit value, so that the UE may recognize the reason for refusal (for example, HO validation failure, load balancing QoS, or the like) of the handover request (HO request). The BS explicitly indicates handover failure to the UE, and accordingly, the UE may perform flexible follow-up operation for refusal of the handover request on the basis of the reason for refusal. According to an embodiment, when the response indicates failure of the validation procedure, unlike in FIG. 12, the UE may identify again the target cell on the basis of the configured neural network structure information and weight information rather than waiting for transmission of the handover request until the next period. Thereafter, the UE may transmit again the handover request for the identified target cell to the serving BS. Meanwhile, according to another embodiment, when the response indicates overload, the UE may wait for transmission of the handover request until the next period or may not transmit the handover request for a predetermined time period (for example, a configuration of a prohibit timer).

In operation 1350, the UE may transmit again the handover request (HO request) after T_HO_req which is the handover request period. Alternatively, unlike in FIG. 13, the UE may transmit again the handover request (HO request) after various time delay methods such as random backoff and the like. In operation 1360, the serving BS may perform a validation procedure (HO validation) through a method that is the same as previous operation 1330. Thereafter, when validation is successful, the serving BS, the target BS, and the UE may perform a normal handover procedure in operation 1370. For example, the handover procedure may mean a procedure after operation 625 of FIG. 6 (HO validation).

Case of Expiration of Lifetime

Figure 14:
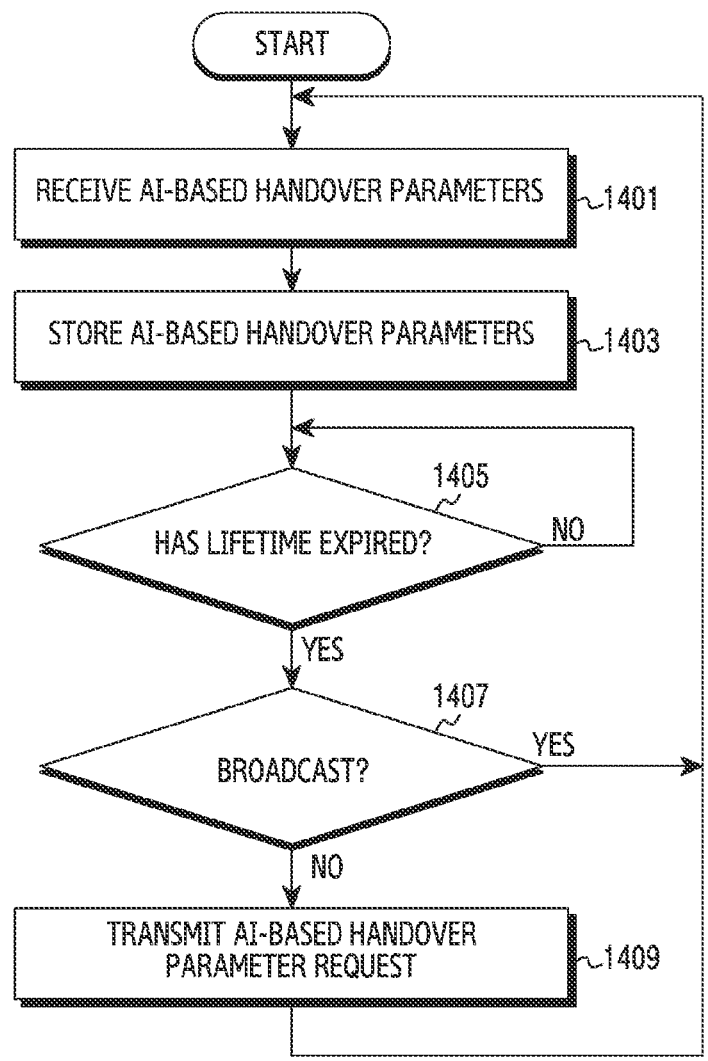
FIG. 14 illustrates the flow of an operation of the UE according to expiration of a lifetime of information relate to a neural network of the AI-based handover according to various embodiments of the disclosure.

FIG. 14 illustrates the flow of an operation of the UE according to expiration of a lifetime of information relate to a neural network of the AI-based handover according to various embodiments of the disclosure. Through FIG. 14, the operation of the UE according to whether a lifetime of a structure information (NN) and a lifetime of weight information (weights (W)) used for the AI-based handover have expired is described.

Referring to FIG. 14, in operation 1401, the UE may receive an AI-based handover parameter. The AI-based handover parameter may include structure information for a neural network model configured for the AI-based handover of the BS and weight information. The UE may receive neural network structure information (NN) or neural network weight information (weights) required for the AI HO from the serving BS. For example, the UE receives configuration information for the neural network structure and configuration information for the weights through the HO NN and the HH W like in operation 621 of FIG. 6. The configuration information for the neural network structure may include a lifetime of the structure information. The configuration information for the weights may include a lifetime of the weight information.

In operation 1403, the UE may store the AI-based handover parameter. The UE may store the neural network structure (NN) and the weights for the AI handover. The UE may manage the lifetime of each of the structure information and weight information acquired in operation 1401. That is, the UE may manage the NN lifetime and W lifetime information which are expiration dates of the corresponding NN and weights.

In operation 1405, the UE may determine whether the lifetime has expired. The UE may perform the AI-based handover on the basis of the AI-based handover parameter until the lifetime expires. The UE may perform operation 1407 when the lifetime expires. When the NN lifetime or the W lifetime has expired, the UE may be required to newly receive the NN or weights.

In operation 1407, the UE may determine whether the AI-based handover parameter is broadcasted. In order to acquire the AI-based handover parameter, the UE may identify whether a method by which the BS transmits the HO NN or the HO W is a broadcast scheme. When the AI-based handover parameter is broadcasted, the BS periodically broadcasts the AI-based handover parameter and thus the UE may return to operation 1401 and receive the HO NN and the HOW which are the AI-based handover parameters transmitted by the BS. The UE may perform operation 1409 when the AI-based handover parameter is not broadcasted.

Since the BS does not broadcast the AI-based handover parameter, the UE may transmit a request for the AI-based handover parameter to the serving BS in operation 1409. The UE may receive the AI-based handover parameter from the serving BS. For example, when the BS unicasts the HO NN and the HO W, the UE may make a request for unicasting the NN or the W to the BS, return to operation 1401, and receive the HO NN and the HO W transmitted by the BS. According to an embodiment, the UE may operate according to the procedure of FIGS. 15A and 15B.

FIG. 14 describes both the lifetime of the structure information (NN lifetime) and the lifetime of the weight information (W lifetime) as the AI-based handover parameters, but the lifetimes of the structure information and the weight information may be independently managed. That is, the procedure of FIG. 14 may be independently performed for the structure information and the weight information. According to an embodiment, when the lifetime of the weight information has expired but the lifetime of the structure information has not yet expired, the UE may make a request for transmitting new weight information to the serving BS or acquire broadcasted new weight information. On the other hand, according to an embodiment, when the lifetime of the structure information has expired but the lifetime of the weight information has not yet expired, the UE may make a request for transmitting new structure information to the serving BS or acquire broadcasted new structure information. In addition, when the lifetime of the structure information has expired, the UE may transmit a request for transmitting the structure information and the weight information to the BS. This is because the weight information may be dependent on the structure information.

Request for AI-Based Handover Parameter

Figure 15A:
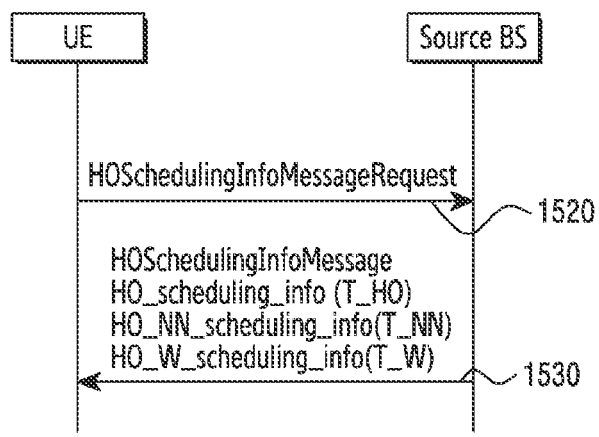
FIG. 15A illustrates an example of operations of the BS and the UE making a request for scheduling information according to various embodiments of the disclosure.

FIG. 15A illustrates an example of operations of the BS and the UE making a request for scheduling information according to various embodiments of the disclosure. The scheduling information is information related to allocation of resources in which parameters used for the AI-based handover are transmitted.

Referring to FIG. 15, in operation 1520, the UE may make a request for information such as ScheduleInformation by transmitting a scheduling information request message related to the AI HO to the BS. The scheduling information request message may be a message making a request for scheduling information of AI-based handover parameters. The BS may receive the scheduling information request message from the UE.

In operation 1530, the UE may receive the scheduling information from the BS. The BS may transmit the scheduling information to the UE in response to the scheduling information request message (HOSchdueInformationMessageRequest (HO-related) message). The scheduling information may be transmitted to the UE through system information. For example, the scheduling information may be transmitted through SystemInformationMessage and may include one or more pieces of the following information.

HO_scheduling_info (T_HO): information indicating whether the AI-based handover is performed HO_NN_scheduling_info (T_NN): structure information of a neural network for the AI-based handover HO_W_scheduling_info (T_W): weight information of a neural network for the AI-based handover The UE may make a request for transmitting broadcasted structure information or weight information to the BS in an on-demand manner. When the UE makes a request for scheduling information related to the AI-based handover to the BS, the serving BS receiving the request may transmit the scheduling information to the UE. At this time, the scheduling information may be transmitted through system information. Although not illustrated in FIG. 15A, the UE may make a request for the structure information of the neural network and the weight information individually to the BS. Detailed signaling therefor is described with reference to FIG. 15B described below.

Figure 15B:
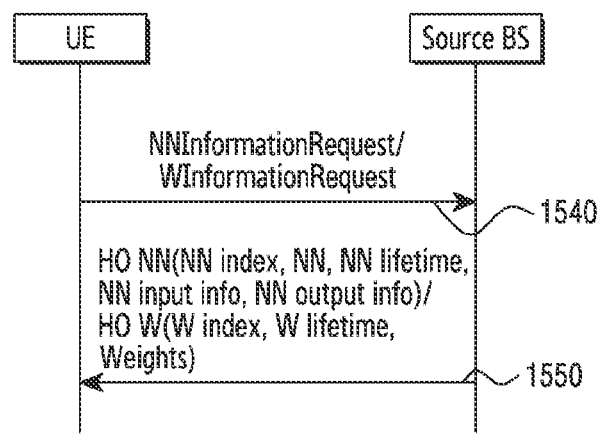
FIG. 15B illustrates an example of operations of the BS and the UE making a request for neural network-related information according to various embodiments of the disclosure.

FIG. 15B illustrates an example of operations of the BS and the UE making a request for neural network-related information according to various embodiments of the disclosure. The neural network-related information may include structure information of the neural network (NN) and weight information (weights).

Referring to FIG. 15B, in operation 1540, the UE may transmit a message making a request for neural network-related information to the BS. The neural network-related information may include neural network structure and weight information used for the AI-based handover.

Although FIG. 15B illustrates that the structure information and the weight information are requested together, requests for the structure information and the weight information may be individually transmitted to the BS. The UE may transmit a structure information request message (NNInformationRequest message) to the BS when the structure information (NN) is needed, and transmit a weight information request message (WInformationRequest message) to the BS when the weight information (weights (W)) is needed.

When receiving the request, the BS may transmit a response message of the request in operation 1550. For example, the BS may transmit a response message including the structure information to the UE. Further, for example, the BS may transmit a response message including the weight information to the UE. In addition, for example, the BS may transmit a response message including both the structure information and the weight information to the UE.

For example, when receiving NNInformationRequest, the BS may transmit an NNInformationResponse message including the following information to the UE.

HO NN (NN index, NN, NN lifetime, NN input info, NN output info)

Alternatively, for example, when receiving WInformationRequest, the BS may transmit a WInformationResponse message including the following information to the UE.

HO W (W index, W lifetime, Weights)

Learning for AI-Based HO

Figure 16A:
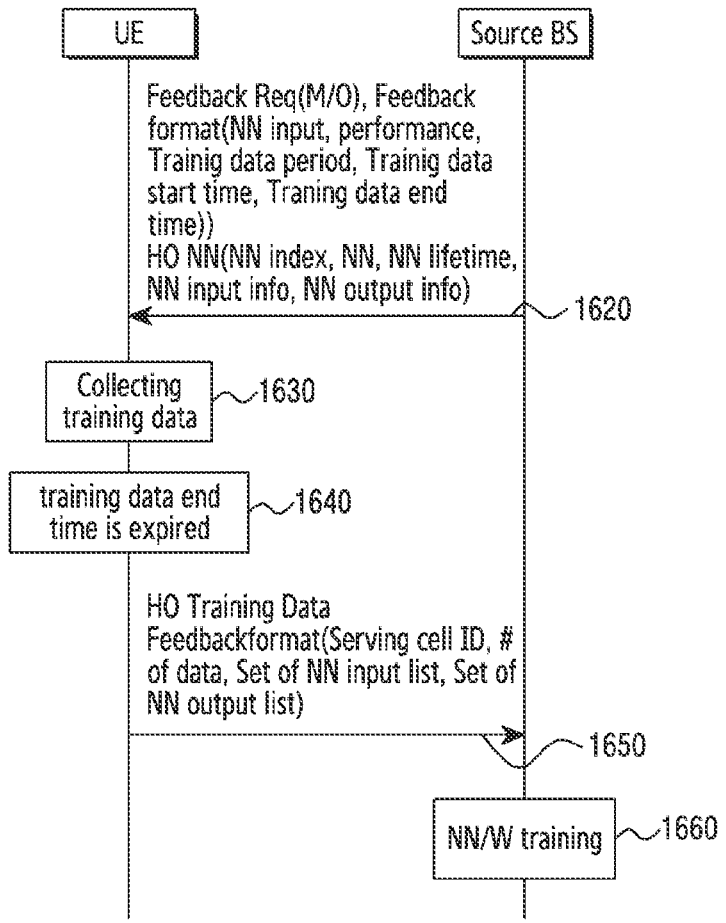
FIG. 16A illustrates an example of BS and UE operations for learning according to various embodiments of the disclosure.

FIG. 16A illustrates an example of operations of the BS and the UE for learning according to various embodiments of the disclosure. A procedure in which the UE feeds back information for learning the NN/W used for the AI-based handover to the BS is described with reference to FIG. 16A.

Referring to FIG. 16A, in operation 1620, the UE may receive feedback configuration information from the BS. The feedback configuration information indicates a return of learning data through a feedback request value within handover indication information (HOInformationMessage). The UE may acquire learning data according to the feedback configuration information and feedback the same to the BS. For example, the UE should mandatorily return learning data when the feedback request is mandatory, and may selectively return the learning data when the feedback request is optional. The UE may receive the following information in order to record the learning data on the basis of the feedback configuration information.

NN input info: input value information of the HO NN, for example, wireless signal intensity (RSRP, RSRQ, SINR, or the like), throughput, an SRS, and a wireless signal which can be measured by the UE such as cqi and the like NN output info: output value format of the HO NN (for example, the existence of nonexistence of the HO (one-hot encoding) or a cell ID) and is generated by the UE according to an HO performance reference value which is a performance value.

▓ Ex1, {HO, not HO},

▓ Ex2, {Serving cell, Neighbor cell1(Cell ID), Neighbor cell2, . . . }

Performance: performance reference of the HO, for example, maximization of a radio signal for a predetermined period, minimization of pingpong, and the like Training data period: NN learning data collection period Training data start time: NN learning data collection start time point Training data end time: NN learning data collection end time point The UE receives the following information when receiving HO NN information.
NN index: NN index used for the HO (the index increases when the NN is updated)
NN: NN used for the HO
NN lifetime: lifetime of the corresponding NN
NN input info: input value of the NN (for example, radio signal intensity list)
NN output info: output value of the NN (for example, the existence or nonexistence of the HO (one-hot encoding) or a cell ID) Ex1, {HO, not HO}, Ex2, {Serving cell, Neighbor cell1(Cell ID), Neighbor cell2, ... }

In operation 1630, the UE may collect training data on the basis of feedback configuration information. The UE records input info of the NN and outinfo of the NN in every training data period from a training data start time to a training data end time, and the output info of the NN configures the right answer based on performance.

In operation 1640, the UE may detect expiration of the learning section. That is, the UE may detect a training data end time. When the training data end time arrives, the UE may record the number of pieces of learning data recorded in every training data period in # of data.

In operation 1650, the UE may feed back training data for the AI-based handover to the serving BS according to a format configured by the feedback configuration information. The UE may store a set of the NN input list and the NN output list and transmit the stored result to the BS of the serving cell. Since this does not correspond to the handover situation, the UE may be accessing the serving BS (source BS). When the UE is in the serving BS, the UE directly returns the previously configured learning data to the serving BS.

In operation 1660, the BS may learn a neural network model for the AI-based handover on the basis of the learning data acquired from the UE. The BS may learn and update the structure information (NN) and the weight information (W) of the neural network model for the AI-based handover. The BS may acquire the updated structure information and weight information according to the learning result.

Figure 16B:
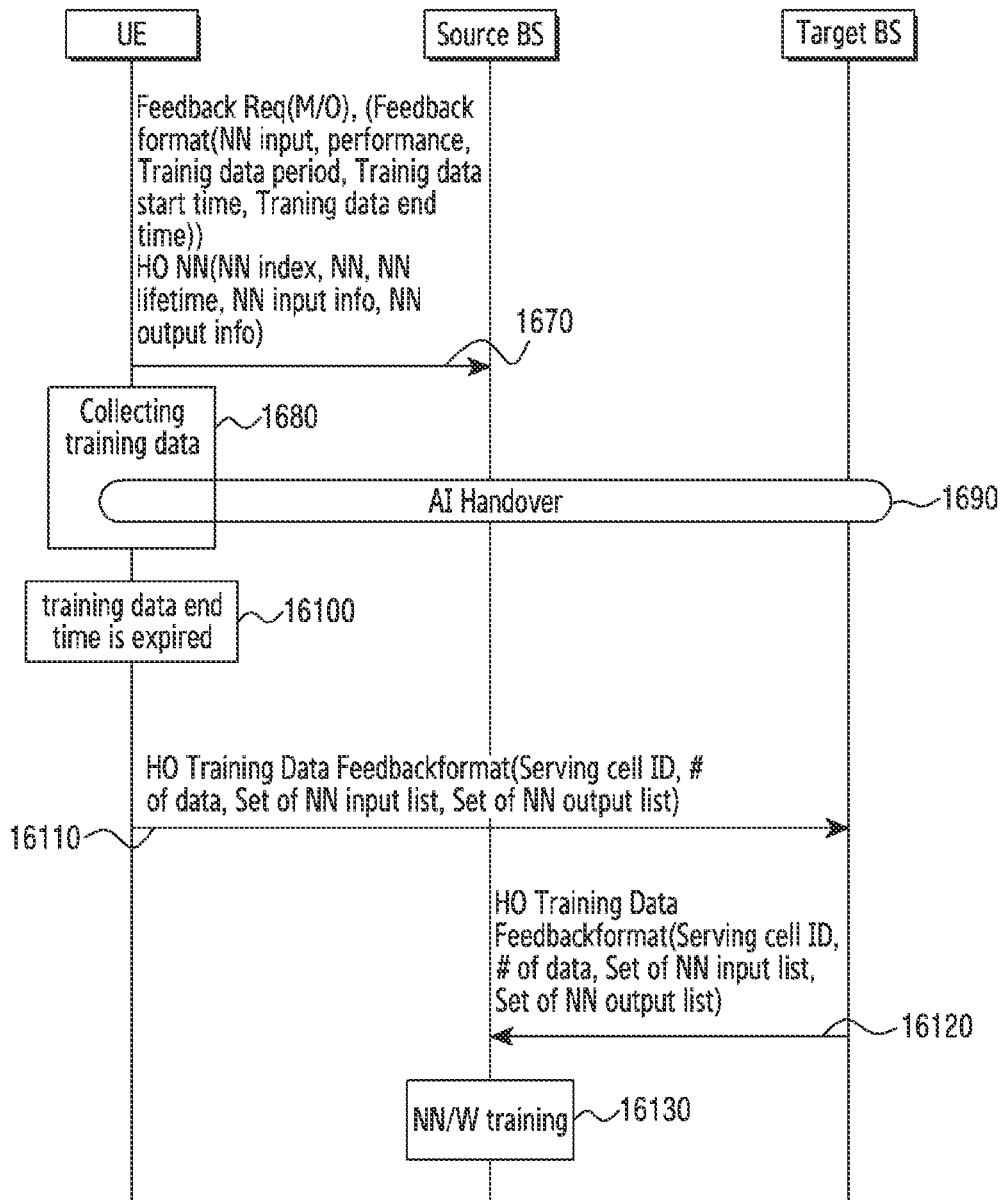
FIG. 16B illustrates an example of operations of the BS and the UE for learning after the AI-based handover according to various embodiments of the disclosure.

FIG. 16B illustrates an example of operations of the BS and the UE for learning after the AI-based handover according to various embodiments of the disclosure. Unlike FIG. 16A, FIG. 16B illustrates a learning data feedback procedure of the UE performed during the AI-based handover procedure.

Referring to FIG. 16B, in operation 1670, the UE may receive feedback configuration information from the BS. Since a detailed description of the feedback configuration information corresponds to the feedback configuration information of FIG. 16A, the same or similar description is omitted.

In operation 1680, the UE may acquire learning data on the basis of the feedback configuration information. Meanwhile, in operation 1690, the UE may perform the AI-based handover procedure with the serving BS and the target BS. The AI-based handover procedure may include a procedure in which the UE transmits a request for the handover to the target cell to the serving BS, a procedure in which the BS of the serving cell makes a request for the handover to the BS of the target cell, and a procedure in which the serving BS transmits a configuration message for the target cell to the UE as illustrated in FIG. 6A.

The handover may occur while learning data is collected like in operation 1690, and thus the handover to the target BS is made. Like in FIG. 16A, the UE may detect expiration of the learning section in operation 16100. In this case, when the requested training data end time arrives, the UE may record the number of pieces of learning data recorded in every training data period in # of data. In operation 16110, the UE may transmit collected learning data to the target BS, not to the source BS. The UE may store a set of the NN input list and the NN output list and transmit the stored result to the target BS which is the current serving cell. When receiving the corresponding message, the target BS may identify an ID of the source BS (or source cell) within the message. Since the ID is different from the ID of the target BS, the target BS may feed back learning data to another BS. In operation 16120, the target BS may transmit the learning data to the source BS. When receiving a message including the learning data from the target BS, the source BS may learn the NN and the W for the AI HO in operation 16130. When the handover is performed, the source BS is not the serving BS any more, and thus the UE does not feed back the learning data. The message including information on the learning data may be transmitted between BSs. For example, the message including the learning data may be transmitted through an X2 interface.

Learning may be performed on the basis of various references whenever the UE transmits learning data or when it is determined that periodic or enough data is stacked (for example, a number of times larger than or equal to a reference value). After the learning, the BS may increase the NN index, so as to manage the neural network information to be distinguished from the NN transmitted to the UE. The BS according to various embodiments may manage the neural network information in unit of cells or cell groups.

FIGS. 16A to 16B have described a scheme for configuring feedback information on the basis of the performance of output of the AI-based handover. For example, the performance of feedback information may be configured as follows.
1) $\Sigma_{T_n} SINR_i$: Total sum of SINRs
2) $\Sigma_{T_n} W_i * SINR_i$: Total sum of SINRs considering weights
3) Existence or nonexistence of pingpong
4) HO interruption time information
5) Weighted Sum of HO related info
$T_n$: denotes a measurement period in an optimal HO, $SINR_i$: denotes an SINR of an $i^{th}$ radio frame (or subframe, slot, or TTI unit), $W_i$: denotes a weight of an SINR of $i^{th}$ radio frame (for example, weight according to pingpong and time)

The disclosure has described a scheme of performing the handover through a cell selection method optimized for the UE, the cell, or the BS by configuring a neural network model through AI and identifying a target cell on the basis of the neural network model and accumulated data. However, various embodiments of the disclosure may be applied in the same or similar way to not only the case in which the handover is performed but also the case in which the UE in the RRC IDLE state selects a cell to perform initial access.

Figure 17:
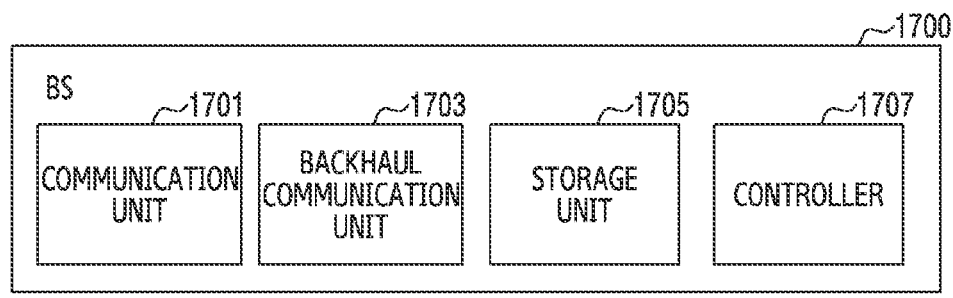
FIG. 17 illustrates a configuration of the BS according to various embodiments of the disclosure.

FIG. 17 illustrates a configuration of a BS according to various embodiments of the disclosure. The configuration illustrated in FIG. 17 may be understood to be the configuration of the BS 110. The term " . . . unit", or the ending of a word, such as " . . . or", " . . . er", or the like, may indicate a unit of processing at least one function or operation, which may be embodied in hardware, software, or a combination of hardware and software.

Referring to FIG. 17, the BS 110 includes a wireless communication unit 1701, a backhaul communication unit 1703, a storage unit 1705, and a controller 1707.

The wireless communication unit 1701 performs functions for transmitting and receiving a signal through a radio channel. For example, the wireless communication unit 1701 performs a function of conversion between a baseband signal and a bitstream according to the physical-layer standard of the system. For example, in data transmission, the wireless communication unit 1701 generates complex symbols by encoding and modulating a transmission bitstream. In data reception, the wireless communication unit 1701 reconstructs a reception bitstream by demodulating and decoding a baseband signal. The wireless communication unit 1701 up-converts a baseband signal into a radio-frequency (RF) band signal, transmits the RF band signal through an antenna, and down-converts an RF band signal received through an antenna into a baseband signal.

To this end, the wireless communication unit 1701 may include a transmission filter, a reception filter, an amplifier, a mixer, an oscillator, a digital-to-analog convertor (DAC), an analog-to-digital convertor (ADC), and the like. Further, the wireless communication unit 1701 may include a plurality of transmission and reception paths. In addition, the wireless communication unit 1701 may include at least one antenna array including a plurality of antenna elements. On the hardware side, the wireless communication unit 1701 may include a digital unit and an analog unit, and the analog unit may include a plurality of sub-units according to operation power, operation frequency, and the like.

The wireless communication unit 1701 may transmit and receive a signal. To this end, the wireless communication unit 1701 may include at least one transceiver. For example, the wireless communication unit 1701 may transmit a synchronization signal, a reference signal, system information, a message, control information, or data. Further, the wireless communication unit 1701 may perform beamforming.

The wireless communication unit 1701 transmits and receives the signal as described above. Accordingly, all or some of the wireless communication unit 1701 may be referred to as a 'transmitter', a 'receiver', a 'transceiver'. Further, in the following description, transmission and reception performed through a radio channel may include the above-described processing by the wireless communication unit 1701.

The backhaul communication unit 1703 provides an interface for communicating with other nodes within the network. That is, the backhaul communication unit 1703 may convert a bitstream transmitted from the BS 110 to another node, for example, another access node, another BS, a higher node, or a core network into a physical signal and convert a physical signal received from another node to a bitstream.

The storage unit 1705 stores data such as a basic program, an application, and configuration information for the operation of the BS 110. The storage unit 1705 may include a memory. The storage unit 1705 may include volatile memory, nonvolatile memory, or a combination of volatile memory and nonvolatile memory. The storage unit 1705 provides stored data in response to a request from the controller 1707. According to an embodiment, the storage unit 1705 may store learning data for the AI-based handover and apply the stored learning data to a neural network structure of the AI-based handover.

The controller 1707 controls the overall operations of the BS 110. For example, the controller 1707 transmits and receives a signal through the wireless communication unit 1701 or the backhaul communication unit 1703. The controller 1707 records data in the storage unit 1705 and reads the same. The controller 1707 may perform the functions of a protocol stack required according to communication standards. To this end, the controller 1707 may include at least one processor.

In some embodiments, the controller 1707 may execute an algorithm for performing a determination operation related to the AI-based handover procedure. The algorithm may include learning algorithms related to a convolutional neural network (CNN), a recurrent neural network (RNN), and a deep neural network (DNN). The controller 1707 may learn an occurring event, a made decision, or collected or input information through the algorithm. The controller 1707 may store the learning result in the storage unit 1705 (for example, a memory).

In some embodiments, the controller 1707 may include an AI-based handover configuration unit. The AI-based handover configuration unit may determine whether there is an actual profit to perform the AI-based handover, determine whether to perform the AI-based handover, and configure parameters (for example, the neural network structure and the weights) for the AI-based handover. According to various embodiments, the controller 1707 may include an update unit. The update unit may acquire data (for example, the existence of nonexistence of the handover to a specific cell in a predetermined environment) updated by the learning procedure between the UE and the BS and reconfigure values of parameters (for example, the neural network structure, information for each node layer, and weight information between nodes) for configuring the neural network on the basis thereof. The AI-based handover configuration unit and update unit are an instruction set or code stored in the storage unit 1705, and may be instructions/code that reside at least temporarily in the controller 1707, a storage space that stores the instructions/code, or part of the circuitry included in the controller 1707. According to various embodiments, the controller 1707 may control the BS 110 to perform operations according to various embodiments.

The configuration of the BS 110 illustrated in FIG. 17 is only an example of the BS and the example of the BS implementing various embodiments of the disclosure is not limited to the configuration illustrated in FIG. 17. That is, according to various embodiments, some elements may be added, deleted, or changed.

FIG. 17 illustrates that the BS is one entity, but the disclosure is not limited thereto. The BS according to various embodiments of the disclosure may be implemented to form an access network having not only integrated deployment but also distributed deployment. According to an embodiment, the BS is divided into a central unit (CU) and a digital unit (DU), and the CU may be implemented to perform a higher-layer function (upper layers) (for example, packet data convergence protocol (PDCP) and RRC) and the DU may be implemented to perform a lower-layer function (lower layers) (for example, medium access control (MAC) and physical (PHY)). The DU of the BS may form beam coverage on a radio channel.

Figure 18:
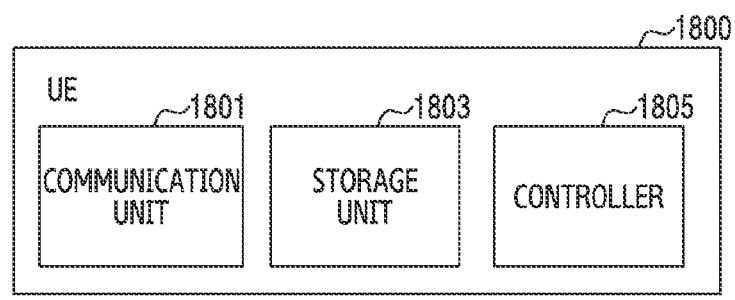
FIG. 18 illustrates a configuration of the UE according to various embodiments of the disclosure.

FIG. 18 illustrates a configuration of the UE according to various embodiments of the disclosure. The configuration illustrated in FIG. 18 may be understood as the configuration of the UE 120. The term " . . . unit", or the ending of a word, such as " . . . or", " . . . er", or the like, may indicate a unit of processing at least one function or operation, which may be embodied in hardware, software, or a combination of hardware and software.

Referring to FIG. 18, the UE 120 includes a communication unit 1801, a storage unit 1803, and a controller 1805.

The communication unit 1801 performs functions for transmitting and receiving a signal through a radio channel.

For example, the communication unit 1801 performs a function of conversion between a baseband signal and a bitstream according to a physical-layer standard of the system. For example, in data transmission, the communication unit 1801 encodes and modulates a transmission bitstream to generate complex symbols. In data reception, the communication unit 1801 reconstructs a reception bitstream by demodulating and decoding a baseband signal. Further, the communication unit 1801 up-converts a baseband signal to an RF band signal, transmits the RF band signal through an antenna, and then down-converts the RF band signal received through the antenna to the baseband signal. For example, the communication unit 1801 may include a transmission filter, a reception filter, an amplifier, a mixer, an oscillator, a DAC, and an ADC.

The communication unit 1801 may include a plurality of transmission/reception paths. The communication unit 1801 may include an antenna unit. The communication unit 1801 may include at least one antenna array including a plurality of antenna elements. On the hardware side, the communication unit 1801 may include a digital circuit and an analog circuit (for example, a radio frequency integrated circuit (RFIC)). The digital circuit and the analog circuit may be implemented as a single package. The communication unit 1801 may include a plurality of RF chains. The communication unit 1801 may perform beamforming. The communication unit 1801 may apply a beamforming weight to a signal in order to assign directivity according to the configuration of the controller 1805 to the signal to be transmitted and received. According to an embodiment, the communication unit 1801 may include a radio frequency (RF) block (or an RF unit). The RF block may include a first RF circuit related to an antenna and a second RF circuit related to baseband processing. The first RF circuit may be referred to as an RF-Antenna (RF-A). The second RF circuit may be referred to as an RF-Baseband (RF-B).

The communication unit 1801 may transmit and receive a signal. To this end, the communication unit 1801 may include at least one transceiver. The communication unit 1801 may receive a downlink signal. The downlink signal may include a synchronization signal (SS), a reference signal (RS)(for example, a cell-specific reference signal (CRS), a demodulation (DM)-RS), system information (for example, a MLB, an SIB, remaining system information (RMSI), and other system information (OSI)), a configuration message, control information, or downlink data. The communication unit 1801 may transmit an uplink signal. The uplink signal may include a random access-related signal (for example, a random access preamble (RAP) (or message 1 (Msg1), message 3 (Msg3)), a reference signal (for example, a sounding reference signal (SRS) or a DM-RS), or a power headroom report (PHR).

The communication unit 1801 may include different communication modules for processing signals in different frequency bands. The communication unit 1801 may include a plurality of communication modules for supporting a plurality of different radio access technologies. For example, the different radio access technologies may include Bluetooth low energy (BLE), Wi-Fi, Wi-Fi gigabyte (WiGig), and cellular network (for example, long-term evolution (LTE), new radio (NR)). Further, different frequency bands may include a super high frequency (SHF) (for example, 2.5 GHz and 5 GHz) band and a millimeter (mm) wave (for example, 38 GHz and 60 GHz) band. The communication unit 1801 may use the same type of RAT in an unlicensed band for different frequency bands (for example, licensed assisted access (LAA)) and citizens broadband radio service (CBRS) (for example, 3.5 GHz).

The communication unit 1801 transmits and receives a signal as described above. Accordingly, all or some of the communication unit 1801 may be referred to as a "transmitter", a "receiver", or a "transceiver". In the following description, transmission and reception performed through a radio channel are used to have a meaning including the processing performed by the communication unit 1801.

The storage unit 1803 stores data such as a basic program, an application, and configuration information for the operation of the UE 120. The storage unit 1803 may include volatile memory, nonvolatile memory, or a combination of volatile memory and nonvolatile memory. The storage unit 1803 provides stored data in response to a request from the controller 1805. According to an embodiment, the storage unit 1803 may store learning data for the AI-based handover according to a feedback format configured by the BS.

The controller 1805 controls the overall operations of the UE 120. For example, the controller 1805 transmits and receives a signal through the communication unit 1801. The controller 1805 records data in the storage unit 1803 and reads the same. The controller 1805 may perform the functions of a protocol stack required by the communication standard. To this end, the controller 1805 may include at least one processor. The controller 1805 may include at least one processor or micro processor or may be a part of the processor. Further, some of the communication unit 1801 and the controller 1805 may be referred to as a CP. The controller 1805 may include various modules for performing communication. According to various embodiments, the controller 1805 may control the UE to perform operations according to various embodiments.

In the wireless communication system according to an embodiment of the disclosure as described above, a method performed by a BS of a serving cell may include a process of transmitting configuration information for an artificial intelligence (AI)-based handover to a UE, a process of receiving a handover request to a target cell according to the AI-based handover from the UE, and a process of transmitting a configuration message for access to the target cell to the UE, based on the handover request, and the target cell may be identified based on a neural network (NN) configured for the AI-based handover and a measurement result of the UE.

In an embodiment, the configuration information may include indication information indicating performance of the AI-based handover and information related to the neural network configured for the AI-based handover, and the information related to the neural network may include structure information for a connection relation between nodes of the neural network and weight information for weights between the nodes.

In an embodiment, the method may further include a process of broadcasting a scheduling message including a period of the indication information, a period of the structure information, and a period of the weight information.

In an embodiment, the handover request may include an identifier of the target cell, a measurement result of the UE used for identifying the target cell, and information related to the neural network used for identifying the target cell.

In an embodiment, the method may further include a process of identifying whether the handover request is valid by determining whether the identifier of the target cell is equal to the measurement result of the UE and a result value according to the information related to the neural network and a process of, when the handover request is valid, transmitting the handover request to the BS of the target cell.

In the wireless communication system according to an embodiment of the disclosure as described above, a method performed by a user equipment (UE) may include a process of receiving configuration information for an artificial intelligence (AI)-based handover from a BS of a serving cell, a process of identifying a target cell according to the AI-based handover, based on a neural network (NN) configured for the AI-based handover and a measurement result, a process of transmitting a handover request to the target cell to the BS, and a process of receiving a configuration message for access to the target cell from the BS.

In an embodiment, the configuration information may include indication information indicating performance of the AI-based handover and information related to the neural network configured for the AI-based handover, and the information related to the neural network may include structure information for a connection relation between nodes of the neural network and weight information for weights between the nodes.

In an embodiment, the method may further include a process of receiving a scheduling message including a period of the indication information, a period of the structure information, and a period of the weight information, and the scheduling message may be transmitted in a broadcast manner.

In an embodiment, the handover request may include an identifier of the target cell, a measurement result of the UE used for identifying the target cell, and information related to the neural network used for identifying the target cell.

In an embodiment, the method may further include a process of receiving feedback configuration information for learning the neural network configured for the AI-based handover, a process of acquiring learning data related to the serving cell, based on the feedback configuration information, and a process of transmitting the learning data to the BS of the serving cell or a BS of the target cell.

In the wireless communication system according to an embodiment of the disclosure as described above, a BS of a serving cell may include at least one transceiver; and at least one processor connected to the at least one transceiver, and the at least one processor may be configured to control the at least one transceiver to transmit configuration information for an artificial intelligence (AI)-based handover to a UE, control the at least one transceiver to receive a handover request to a target cell according to the AI-based handover from the UE, and control the at least one transceiver to transmit a configuration message for access to the target cell to the UE, based on the handover request, and the target cell may be identified based on a neural network (NN) configured for the AI-based handover and a measurement result of the UE.

In an embodiment, the configuration information may include indication information indicating performance of the AI-based handover and information related to the neural network configured for the AI-based handover, and the information related to the neural network may include structure information for a connection relation between nodes of the neural network and weight information for weights between the nodes.

In an embodiment, the at least one processor may be configured to additionally control the at least one transceiver to broadcast a scheduling message including a period of the indication information, a period of the structure information, and a period of the weight information.

In an embodiment, the handover request may include an identifier of the target cell, a measurement result of the UE used for identifying the target cell, and information related to the neural network used for identifying the target cell.

In an embodiment, the at least one processor may be configured to identify whether the handover request is valid by determining whether the identifier of the target cell is equal to the measurement result of the UE and a result value according to the information related to the neural network and additionally control the at least one transceiver to transmit the handover request to the BS of the target cell when the handover request is valid.

In the wireless communication system according to an embodiment of the disclosure as described above, a user equipment (UE) may include at least one transceiver and at least one processor connected to the at least one transceiver, and the at least one processor may be configured to control the at least one transceiver to receive configuration information for an artificial intelligence (AI)-based handover from a BS of a serving cell, identify a target cell according to the AI-based handover, based on a neural network (NN) configured for the AI-based handover and a measurement result, control the at least one transceiver to transmit a handover request to the target cell to the BS, and control the at least one transceiver to receive a configuration message for access to the target cell from the BS.

In an embodiment, the configuration information may include indication information indicating performance of the AI-based handover and information related to the neural network configured for the AI-based handover, and the information related to the neural network may include structure information for a connection relation between nodes of the neural network and weight information for weights between the nodes.

In an embodiment, the at least one processor may be configured to additionally control the at least one transceiver to receive a scheduling message including a period of the indication information, a period of the structure information, and a period of the weight information, and the scheduling message may be transmitted in a broadcasting manner.

In an embodiment, the handover request may include an identifier of the target cell, a measurement result of the UE used for identifying the target cell, and information related to the neural network used for identifying the target cell.

In an embodiment, the at least one processor may control the at least one transceiver to receive feedback configuration information for learning a neural network configured for the AI-based handover, acquire learning data related to the serving cell, based on the feedback configuration information, and control the at least one transceiver to transmit the learning data to the BS of the serving cell or a BS of the target cell.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a base station (BS) of a serving cell in a wireless communication system, the method comprising:
   determining whether to perform an artificial intelligence (AI)-based handover based on a metric associated with an accuracy of the AI-based handover and a threshold;
   transmitting, to a user equipment (UE), configuration information for the AI based handover;
   receiving, from the UE, a handover request to a target cell according to the AI-based handover; and
   transmitting, to the UE, a configuration message for access to the target cell, based on the handover request, wherein the target cell is identified based on a neural network configured for the AI-based handover and a measurement result of the UE.

2. The method of claim 1, wherein the configuration information further includes:
   indication information indicating a performance of the AI-based handover and information associated with the neural network configured for the AI-based handover, and
   wherein the information associated with the neural network includes structure information comprising a connection relation between nodes of the neural network and weight information for weights between the nodes.

3. The method of claim 2, further comprising:
   transmitting, to the UE, a scheduling message including a period of the indication information, a period of the structure information, and a period of the weight information.

4. The method of claim 1, wherein the handover request includes an identifier of the target cell, the measurement result of the UE used for identifying the target cell, and information associated with the neural network used for identifying the target cell.

5. The method of claim 4, further comprising:
   identifying whether the handover request is valid by determining whether the identifier of the target cell matches an output value of the neural network, wherein the output value is generated based on the measurement result of the UE and the information associated with the neural network; and
   in case that the handover request is valid, transmitting, to another BS of the target cell, the handover request.

6. A method performed by a user equipment (UE) in a wireless communication system, the method comprising:
   determining whether to perform an artificial intelligence (AI)-based handover based on a metric associated with an accuracy of the AI-based handover and a threshold;
   receiving, from a base station (BS) of a serving cell, configuration information for the AI based handover;
   identifying a target cell according to the AI-based handover, based on a neural network configured for the AI-based handover and a measurement result;
   transmitting, to the BS, a handover request to the target cell to the BS; and
   receiving, from the BS, a configuration message for access to the target cell.

7. The method of claim 6, wherein the configuration information further includes indication information indicating a performance of the AI-based handover and information associated with the neural network configured for the AI-based handover, and
   wherein the information associated with the neural network includes structure information comprising a connection relation between nodes of the neural network and weight information for weights between the nodes.

8. The method of claim 7, further comprising:
   receiving, from the BS, a scheduling message including a period of the indication information, a period of the structure information, and a period of the weight information.

9. The method of claim 6, wherein the handover request includes an identifier of the target cell, the measurement result of the UE used for identifying the target cell, and information associated with the neural network used for identifying the target cell.

10. The method of claim 9, further comprising:
    receiving, from the BS, feedback configuration information for learning the neural network configured for the AI-based handover;
    acquiring learning data associated with the serving cell, based on the feedback configuration information; and transmitting, to the BS of the serving cell or another BS of the target cell, the learning data.

11. A base station (BS) of a serving cell in a wireless communication system, the BS comprising:
a transceiver; and
a controller coupled with the transceiver and configured to:
determine whether to perform an artificial intelligence (AI)-based handover based on a metric associated with an accuracy of the AI-based handover and a threshold,
transmit, to a user equipment (UE), configuration information for an artificial intelligence (AI)-based handover,
receive, from the UE, a handover request to a target cell according to the AI-based handover, and
transmit, to the UE, a configuration message for access to the target cell, based on the handover request,
wherein the target cell is identified based on a neural network configured for the AI-based handover and a measurement result of the UE.

12. The BS of claim 11, wherein the configuration information further includes indication information indicating a performance of the AI-based handover and information associated with the neural network configured for the AI-based handover, and
wherein the information associated with the neural network includes structure information comprising a connection relation between nodes of the neural network and weight information for weights between the nodes.

13. The BS of claim 12, wherein the controller is further configured to:
transmit, to the UE, a scheduling message including a period of the indication information, a period of the structure information, and a period of the weight information.

14. The BS of claim 11, wherein the handover request includes an identifier of the target cell, the measurement result of the UE used for identifying the target cell, and information associated with the neural network used for identifying the target cell.

15. The BS of claim 14, wherein the controller is further configured to:
identify whether the handover request is valid by determining whether the identifier of the target cell matches a output value of the neural network, wherein the output value is generated based on the measurement result of the UE and the information associated with the neural network, and
in case that the handover request is valid, transmit, to another BS of the target cell, the handover request.

16. The method of claim 1, wherein the metric for the accuracy of the AI-based handover comprises error information of the AI-based handover.

17. The method of claim 6, wherein the metric for the accuracy of the AI-based handover comprises error information of the AI-based handover.

18. The BS of claim 11, wherein the metric for the accuracy of the AI-based handover comprises error information of the AI-based handover.

19. A user equipment (UE) in a wireless communication system, the UE comprising:
a transceiver; and
a controller coupled with the transceiver, and configured to:
determine whether to perform an artificial intelligence (AI)-based handover based on a metric associated with an accuracy of the AI-based handover and a threshold,
receive, from a base station (BS) of a serving cell, configuration information for the AI-based handover,
identify a target cell according to the AI-based handover, based on a neural network configured for the AI-based handover and a measurement result,
transmit, to the BS, a handover request to the target cell, and
receive, from the BS, a configuration message for access to the target cell.

20. The UE of claim 19,
wherein the configuration information includes indication information indicating a performance of the AI-based handover and information associated with the neural network configured for the AI-based handover, and
wherein the information associated with the neural network includes structure information comprising a connection relation between nodes of the neural network and weight information for weights between the nodes.

21. The UE of claim 20, wherein the controller is further configured to:
receive, from the BS, a scheduling message including a period of the indication information, a period of the structure information, and a period of the weight information.

22. The UE of claim 19, wherein the handover request includes an identifier of the target cell, the measurement result of the UE used for identifying the target cell, and information associated with the neural network used for identifying the target cell.

23. The UE of claim 22, wherein the controller is further configured to:
receive, from the BS, feedback configuration information for learning the neural network configured for the AI-based handover,
acquire learning data associated with the serving cell, based on the feedback configuration information, and
transmit, to the BS of the serving cell or another BS of the target cell, the learning data.

24. The UE of claim 19, wherein the metric for the accuracy of the AI-based handover comprises error information of the AI-based handover.

* * * * *